United States Patent
Li et al.

(10) Patent No.: US 12,206,858 B2
(45) Date of Patent: Jan. 21, 2025

(54) CROSS COMPONENT PREDICTION OF CHROMA SAMPLES

(71) Applicant: Alibaba (China) Co., Ltd., Hangzhou (CN)

(72) Inventors: Xinwei Li, Beijing (CN); Yan Ye, San Diego, CA (US); Ru-ling Liao, Beijing (CN); Jie Chen, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 43 days.

(21) Appl. No.: 18/325,704

(22) Filed: May 30, 2023

(65) Prior Publication Data

US 2023/0403397 A1 Dec. 14, 2023

Related U.S. Application Data

(60) Provisional application No. 63/402,944, filed on Aug. 31, 2022, provisional application No. 63/358,172, (Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11); *H04N 19/70* (2014.11)

(58) Field of Classification Search
CPC ..... H04N 19/132; H04N 19/86; H04N 19/105
See application file for complete search history.

(56) References Cited

U.S. PATENT DOCUMENTS

2020/0099952 A1    3/2020  Kanoh et al.
2021/0105506 A1*   4/2021  Misra ............... H04N 19/186
(Continued)

FOREIGN PATENT DOCUMENTS

CN    109379599 A      2/2019
WO    2020129990 A1    6/2020
WO    2020149630 A1    7/2020

OTHER PUBLICATIONS

PCT International Search Report and Written Opinion mailed Sep. 19, 2023, issued in corresponding International Application No. PCT/CN2023/098703 (9 pgs.).

(Continued)

*Primary Examiner* — Zhubing Ren
(74) *Attorney, Agent, or Firm* — Finnegan, Henderson, Farabow, Garrett & Dunner, LLP

(57) ABSTRACT

During video encoding or decoding, cross-component prediction can be used to predict a chroma sample from collocated reconstructed luma samples. The prediction can be based on a gradient of the collocated reconstructed luma samples, a down-sampled value of the collocated reconstructed luma samples, or a combination thereof. An exemplary method includes: determining a first value associated with a chroma sample, by applying a first gradient pattern to reconstructed values of a first plurality of luma samples; determining a second value associated with the chroma sample, by applying a down-sampling filter to reconstructed values of a second plurality of luma samples; and predicting the chroma sample based on the first value and the second value.

16 Claims, 12 Drawing Sheets

Related U.S. Application Data filed on Jul. 4, 2022, provisional application No. 63/350,764, filed on Jun. 9, 2022.

(51) Int. Cl.
*H04N 19/176* (2014.01)
*H04N 19/186* (2014.01)
*H04N 19/70* (2014.01)

(56) References Cited

U.S. PATENT DOCUMENTS

2022/0007051 A1* 1/2022 Sethuraman ......... H04N 19/172
2022/0239906 A1* 7/2022 Chen ................... H04N 19/147

OTHER PUBLICATIONS

"Requirements for a Future Video Coding Standard v5," International Organisation for Standardisation, Torino, IT, 14 pages (2017).
Chen et al., "Algorithm Description of Joint Exploration Test Model 7 (JEM 7)," JVET-G1001-v1, $7^{th}$ Meeting: Torino, IT, Jul. 13-21, 2017, 50 pages.
Coban et al., Algorithm description of Enhanced Compression Model 3 (ECM 3), JVET-X2025, $23^{rd}$ meeting, by teleconference, Jul. 7-16, 2021, 28 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/svn_HMJEMSoftware.
Kuo et al.,"AHG12: Enhanced CCLM," JVET-Z0140-v2, $26^{th}$ Meeting, by teleconference, Apr. 20-29, 2022, 6 pages.
Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

CROSS COMPONENT PREDICTION OF CHROMA SAMPLES

CROSS-REFERENCE TO RELATED APPLICATIONS

The disclosure claims the benefits of priority to: U.S. Provisional Application No. 63/350,764, filed on Jun. 9, 2022; U.S. Provisional Application No. 63/358,172, filed on Jul. 4, 2022; and U.S. Provisional Application No. 63/402,944, filed on Aug. 31, 2022. All of the claimed provisional applications are incorporated herein by reference in their entireties.

TECHNICAL FIELD

The present disclosure generally relates to video processing, and more particularly, to methods and systems for predicting chroma samples based on collocated luma samples.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure are directed. In some embodiments, a computer-implemented method includes: determining a first value associated with a chroma sample, by applying a first gradient pattern to reconstructed values of a first plurality of luma samples; determining a second value associated with the chroma sample, by applying a down-sampling filter to reconstructed values of a second plurality of luma samples; and predicting the chroma sample based on the first value and the second value.

Embodiments of the present disclosure further provide an apparatus for processing video data. The system comprises: a memory storing a set of instructions; and one or more processors configured to execute the set of instructions to cause the apparatus to perform: determining a first value associated with a chroma sample, by applying a first gradient pattern to reconstructed values of a first plurality of luma samples; determining a second value associated with the chroma sample, by applying a down-sampling filter to reconstructed values of a second plurality of luma samples; and predicting the chroma sample based on the first value and the second value.

Embodiments of the present disclosure further provide a non-transitory computer readable medium that stores a bitstream of video for processing according to a method including: determining a first value associated with a chroma sample, by applying a first gradient pattern to reconstructed values of a first plurality of luma samples; determining a second value associated with the chroma sample, by applying a down-sampling filter to reconstructed values of a second plurality of luma samples; and predicting the chroma sample based on the first value and the second value.

Embodiments of the present disclosure further provide a non-transitory computer readable medium that stores a set of instructions that is executable by one or more processors of an apparatus to cause the apparatus to initiate a method for processing video data. The method includes: determining a first value associated with a chroma sample, by applying a first gradient pattern to reconstructed values of a first plurality of luma samples; determining a second value associated with the chroma sample, by applying a down-sampling filter to reconstructed values of a second plurality of luma samples; and predicting the chroma sample based on the first value and the second value.

Embodiments of the present disclosure further provide a method for processing video data. The method comprises: predicting a chroma sample from a collocated luma sample associated with the chroma sample, wherein the predicting is based on a non-linear model defining a non-linear relationship between a predicted value of the chroma sample and a value associated with the collocated luma sample.

Embodiments of the present disclosure further provide an apparatus for processing video data. The system comprises: a memory storing a set of instructions; and one or more processors configured to execute the set of instructions to cause the apparatus to perform: predicting a chroma sample from a collocated luma sample associated with the chroma sample, wherein the predicting is based on a non-linear model defining a non-linear relationship between a predicted value of the chroma sample and a value associated with the collocated luma sample.

Embodiments of the present disclosure further provide a non-transitory computer readable medium that stores a bitstream of video for processing according to a method including: predicting a chroma sample from a collocated luma sample associated with the chroma sample, wherein the predicting is based on a non-linear model defining a non-linear relationship between a predicted value of the chroma sample and a value associated with the collocated luma sample Embodiments of the present disclosure further provide a non-transitory computer readable medium that stores a set of instructions that is executable by one or more processors of an apparatus to cause the apparatus to initiate a method for processing video data. The method includes: predicting a chroma sample from a collocated luma sample associated with the chroma sample, wherein the predicting is based on a non-linear model defining a non-linear relationship between a predicted value of the chroma sample and a value associated with the collocated luma sample.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
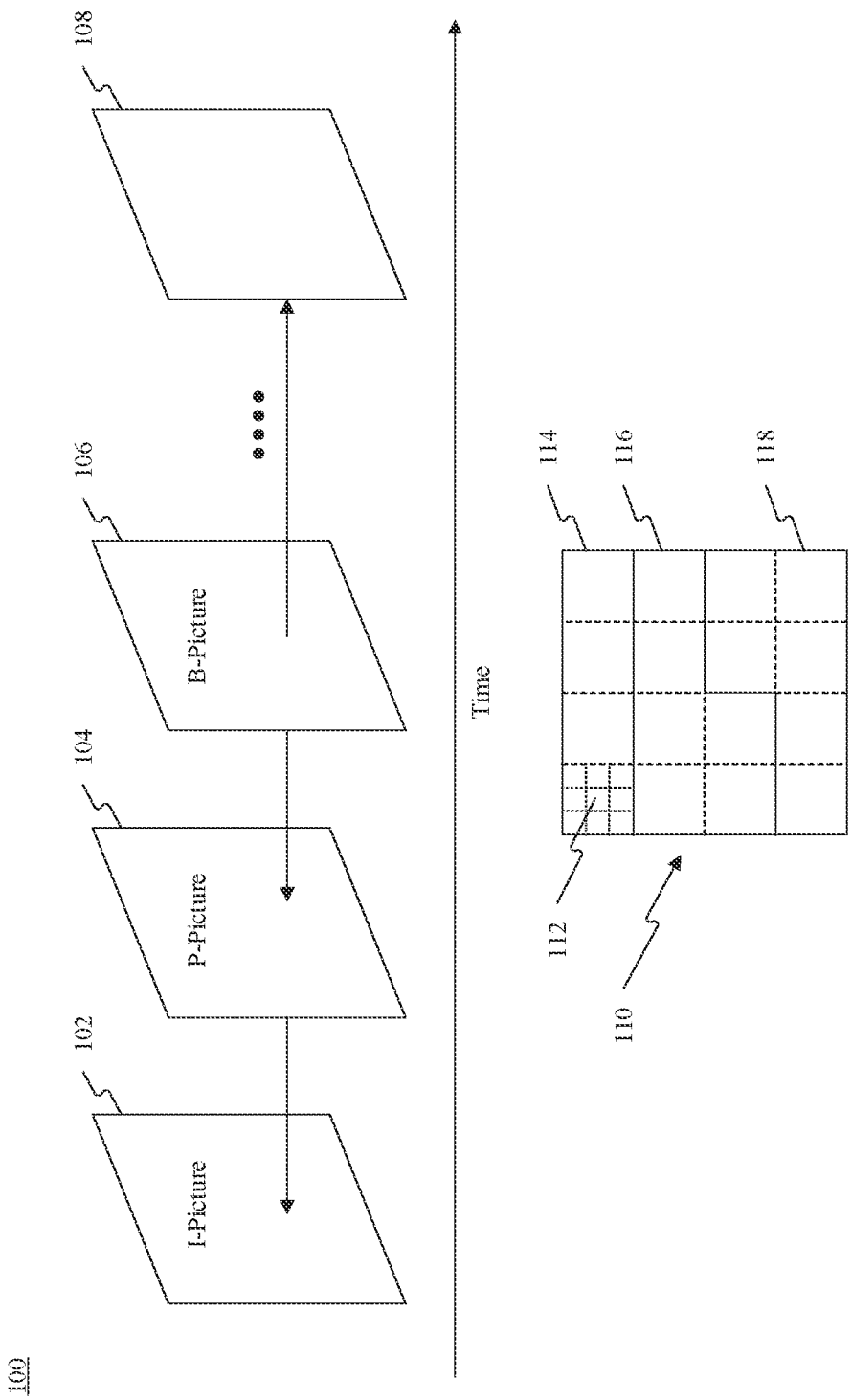
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The embodiments provided by the present disclosure are directed to encoding and decoding video information, and more particularly, to methods and systems for predicting a chroma sample based on one or more collocated luma samples, Such process is referred to as cross-component prediction throughout the disclosure. As described below in detail, the cross-component prediction can employ a Cross Component Linear Model (CCLM), a Cross Component Non-Linear Model (CCNLM), a gradient model, or a combination thereof.

The disclosed CCLM, CCNLM, and gradient model are used for encoding or decoding video data. A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x, AVS series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIGS. 1, 2A, 2B, 3A, 3B, and 4 illustrate the general aspects of the video encoding/decoding apparatuses and processes used in the disclosed embodiments. Specifically, FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4x4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, or AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC, H.266/VVC or AVS). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, H.264/AVC, or AVS), or as "coding units" ("CUs") in some other video coding standards (e.g., H.265/HEVC, H.266/VVC, or AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
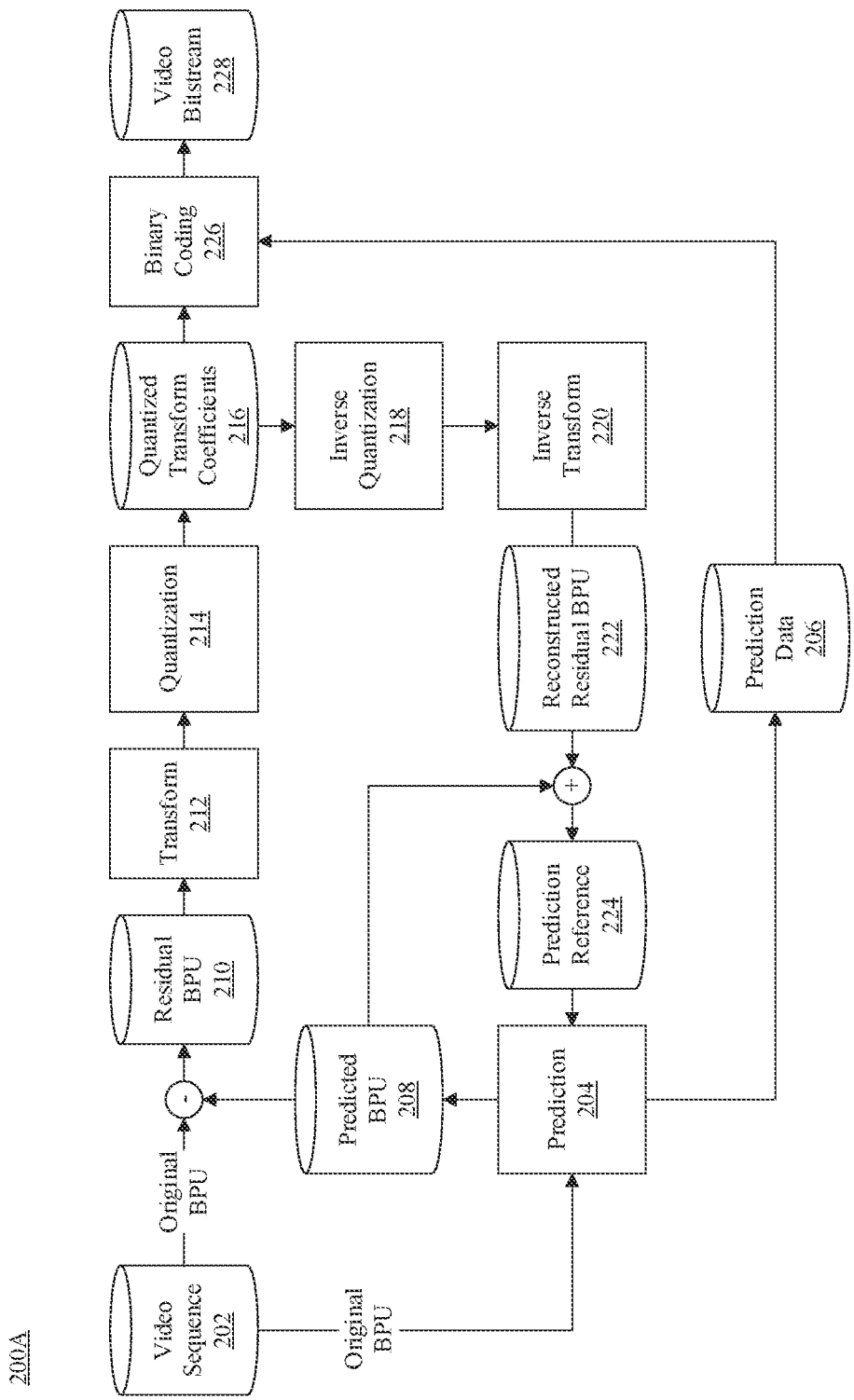
FIG. 2A is a schematic diagram illustrating an example encoding process of a hybrid video coding system, according to some embodiments of the present disclosure.
Figure 2B:
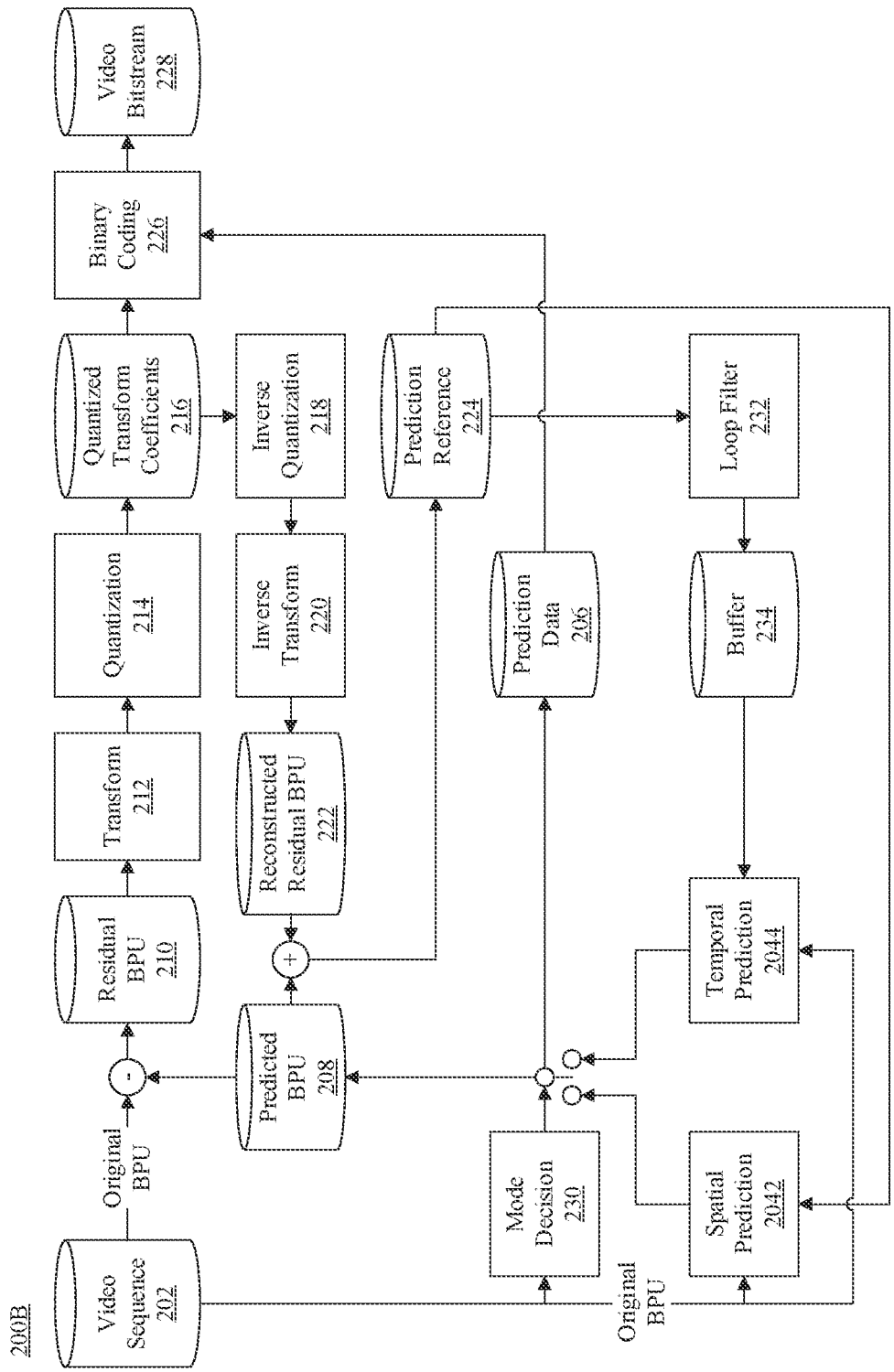
FIG. 2B is a schematic diagram illustrating another example encoding process of a hybrid video coding system, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, or AVS), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC, H.266/VVC, or AVS), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC, H.266/VVC, or AVS), at the level of which the transform operation can be performed. It should be noted that the division schemes of the same basic processing sub-unit can be different at the prediction stage and the transform stage. For example, in H.265/HEVC, H.266/VVC, or AVS, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC, H.266/VVC and AVS provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224 and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
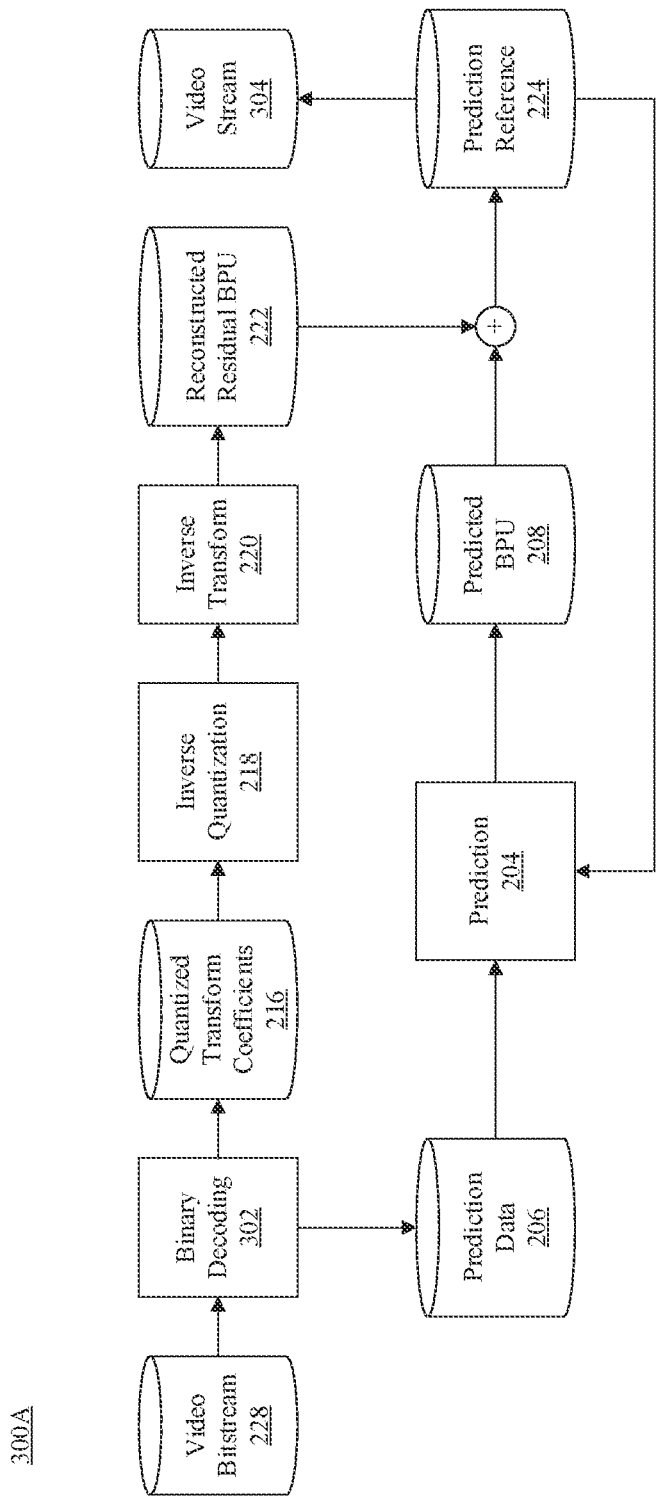
FIG. 3A is a schematic diagram illustrating an example decoding process of a hybrid video coding system, according to some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
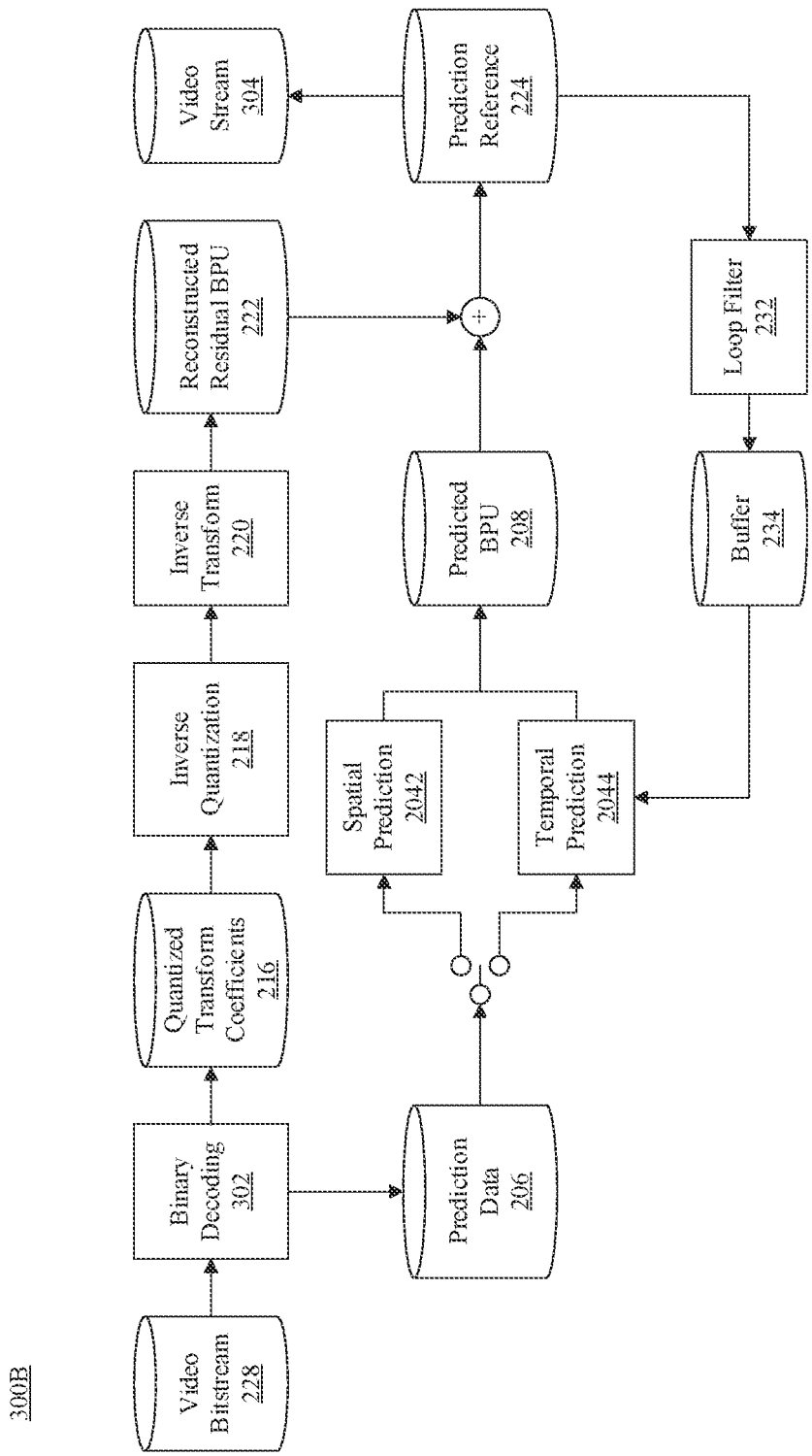
FIG. 3B is a schematic diagram illustrating another example decoding process of a hybrid video coding system, according to some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
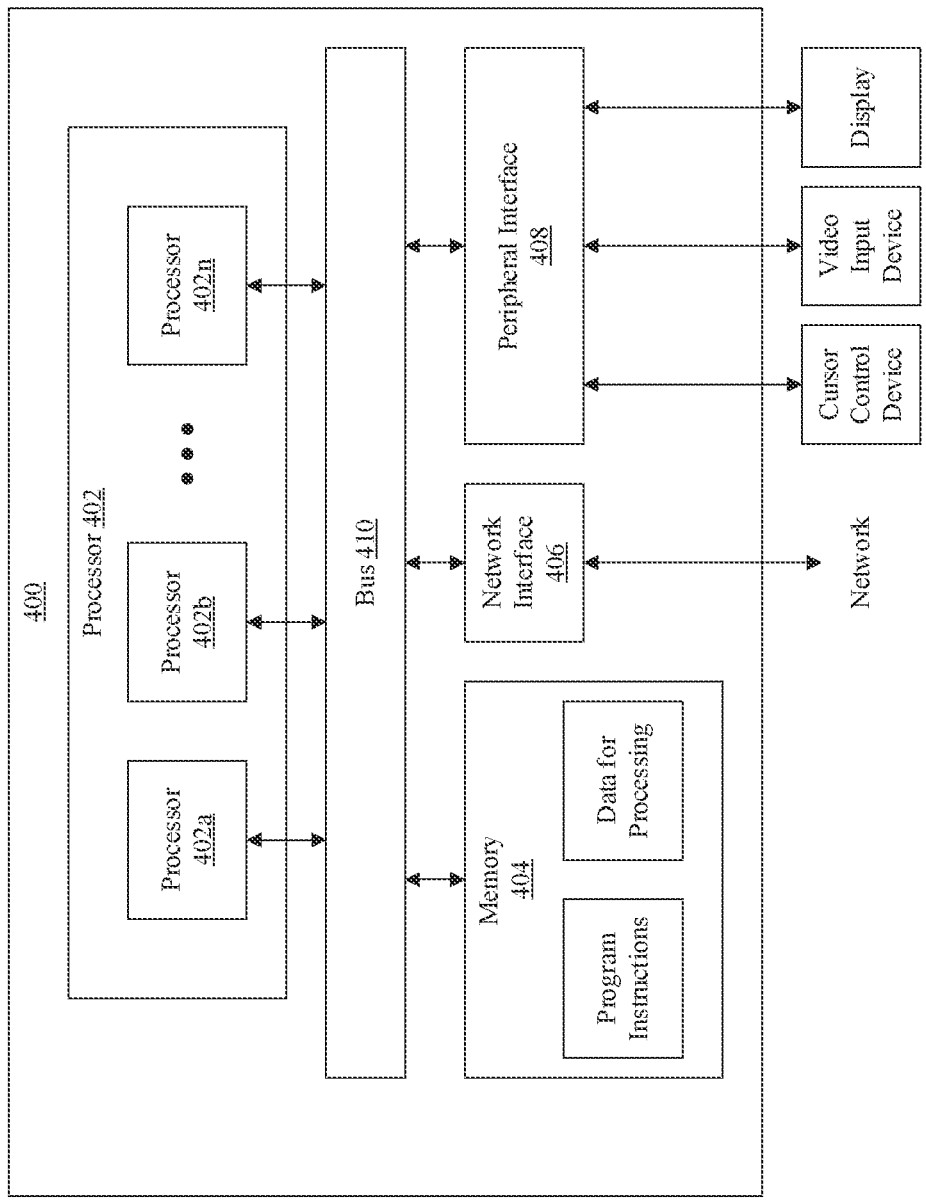
FIG. 4 is a block diagram of an example apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides video encoding and decoding methods for using a cross component linear model (CCLM), a cross component non-linear model (CCNLM), or a gradient model to predict chroma samples based on collocated luma samples. The disclosed models can be freely combined to perform the chroma sample prediction. The disclosed cross-component prediction methods can reduce the cross-component redundancy and can be used in conjunction with any image/video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc.

According to some embodiments, a CCLM can be used to predict a chroma sample of a block from the collocated reconstructed luma sample by a linear model as Equation 1.

$$\text{pred}_c(i, j) = \alpha \cdot \text{rec}'_L(i, j) + \beta \quad \text{(Eq. 1)}$$

where $\text{pred}_c(i, j)$ represents the predicted values of the chroma samples in the current block and $\text{rec}'_L(i, j)$ represents the reconstructed values of the collocated luma samples of the same block which are down-sampled for the case of non-4:4:4 color format; $(i, j)$ is the coordinate of a sample in the block; coefficients $\alpha$ and $\beta$ can represent a linear model and the values of the two coefficients are derived based on reconstructed samples that are adjacent to the current block at both encoder and decoder side without explicit signaling.

Three CCLM modes, CCLM_LT, CCLM_L and CCLM_T, are described below in detail. These three modes differ with respect to the locations of the reconstructed adjacent samples that are used for linear model parameters ($\alpha$ and $\beta$) derivation. The above reconstructed adjacent samples are involved in the CCLM_T mode and the left reconstructed adjacent samples are involved in the CCLM_L mode. In the CCLM_LT mode, both above and left reconstructed adjacent samples are used.

In the signaling of the chroma intra mode, a flag indicating whether CCLM is applied is signaled first. If the flag is signaled as true, it is further signaled which of the three CCLM modes is applied.

In the disclosed embodiments, down-sampling of the reconstructed luma sample can be used. To match the chroma sample locations for 4:2:0 or 4:2:2 color format video sequences, two types of down-sampling filter as shown in Equation 2 and Equation 3 can be applied to luma samples, both of which have a 2-to-1 down-sampling ratio in the horizontal and vertical directions. Based on a SPS-level flag, the 2-dimensional 6-tap or 5-tap filter is applied to the luma samples within the current block as well as its adjacent luma samples. When the SPS-level flag is equal to 1, it signals that the prediction processes operate in a manner designed for chroma sample positions that are not vertically shifted relative to corresponding luma sample positions and the 5-tap filter is used; and when the SPS-level flag is equal to 0, it signals that the prediction processes operate in a manner designed for chroma sample positions that are shifted downward by 0.5 in units of luma samples relative to corresponding luma sample positions and the 6-tap filter is used. An exception happens if the top line of the current block is a CTU boundary. In this case, the one-dimensional 3-tap filter as shown in Equation 4 is applied to the above adjacent luma samples in order to avoid the usage of more than one luma line above the CTU boundary.

$$f1 = \begin{pmatrix} 0 & 1 & 0 \\ 1 & 4 & 1 \\ 0 & 1 & 0 \end{pmatrix} \quad \text{(Eq. 2)}$$

-continued $$f2 = \begin{pmatrix} 1 & 2 & 1 \\ 1 & 2 & 1 \end{pmatrix} \quad \text{(Eq. 3)}$$

$$f3 = \begin{pmatrix} 1 & 2 & 1 \end{pmatrix} \quad \text{(Eq. 4)}$$

The process of down-sampling using the aforementioned filters can be represented by the following equations, where Equation 5, Equation 6, and Equation 7 correspond to the filters in Equation 2, Equation 3, and Equation 4, respectively.

$$rec'_L(i,j) = \begin{bmatrix} rec_L(2i, 2j-1) + rec_L(2i-1, 2j) + \\ 4 \cdot rec_L(2i, 2j) + rec_L(2i+1, 2j) + \\ rec_L(2i, 2j+1) + 4 \end{bmatrix} \gg 3 \quad \text{(Eq. 5)}$$

$$rec'_L(i,j) = \begin{bmatrix} rec_L(2i-1, 2j) + 2 \cdot rec_L(2i, 2j) + \\ rec_L(2i+1, 2j) + rec_L(2i-1, 2j+1) + \\ 2 \cdot rec_L(2i, 2j+1) + rec_L(2i+1, 2j+1) + 4 \end{bmatrix} \gg 3 \quad \text{(Eq. 6)}$$

$$rec'_L(i,j) = [rec_L(2i-1, 2j) + 2 \cdot rec_L(2i, 2j) + rec_L(2i+1, 2j) + 2] \gg 2 \quad \text{(Eq. 7)}$$

where $rec_L$ represents the reconstructed values of the collocated luma samples and $rec'_L$ represents the reconstructed values of the down-sampled collocated luma samples.

The linear model coefficients $\alpha$ and $\beta$ are derived based on reconstructed adjacent chroma samples and their corresponding reconstructed luma samples which are down-sampled for the case of non-4:4:4 color format at both encoder and decoder side to avoid any signaling overhead.

Figure 5:
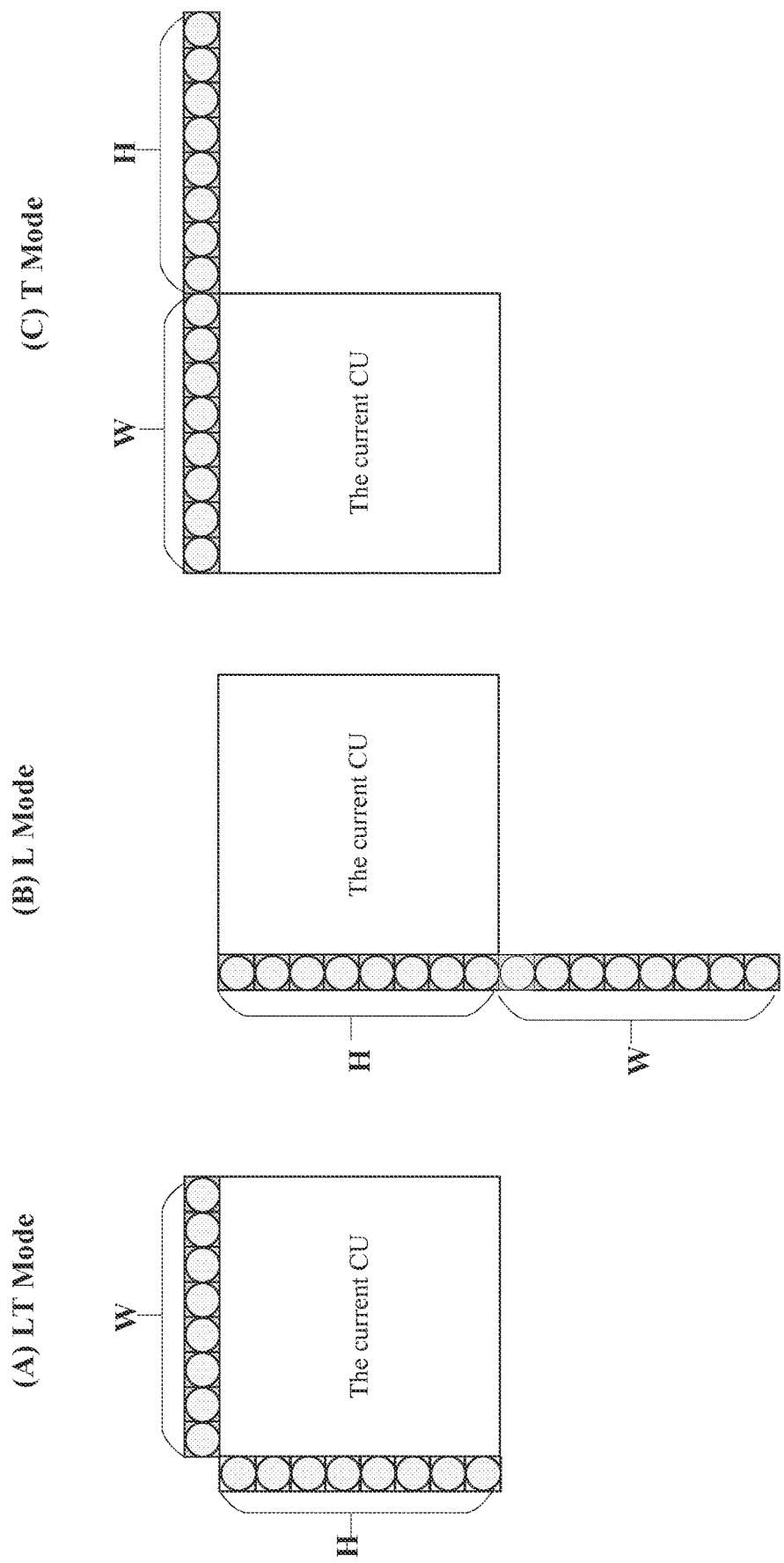
FIG. 5 is a schematic diagram illustrating an example method for using adjacent samples to derive parameters of a cross-component model, according to some embodiments of the present disclosure.

In the initially adopted version of the CCLM mode, the linear minimum mean square error (LMMSE) estimator was used for derivation of the parameters:

$$\alpha = \frac{N \cdot \sum_{n=0}^{N-1}(rec_C(n) \cdot rec'_L(n)) - \sum_{n=0}^{N-1} rec_C(n) \cdot \sum_{n=0}^{N-1} rec'_L(n)}{N \cdot \sum_{n=0}^{N-1}(rec'_L(n) \cdot rec'_L(n)) - \sum_{n=0}^{N-1} rec'_L(n) \cdot \sum_{n=0}^{N-1} rec'_L(n)} \quad \text{(Eq. 8)}$$

$$\beta = \frac{\sum_{n=0}^{N-1} rec_C(n) - \alpha \cdot \sum_{n=0}^{N-1} rec'_L(n)}{N} \quad \text{(Eq. 9)}$$

where $rec'_L(n)$ represents the reconstructed values of the down-sampled adjacent luma samples, $rec_C(n)$ represents the reconstructed values of the adjacent chroma samples, and N is the total number of the used adjacent samples. FIG. 5 illustrates adjacent samples used to derive parameters of a cross-component model, according to some embodiments of the present disclosure. In FIG. 5, the adjacent samples used for deriving the model parameters are shown as circles. As shown in FIG. 5, for a W×H chroma CU, the CCLM_LT mode uses the above adjacent W samples and the left adjacent H samples (FIG. 5A), the CCLM_L mode uses the left adjacent (H+W) samples (FIG. 5B), and the CCLM_T mode uses the above adjacent (W+H) samples (FIG. 5C).

In some embodiments, in order to ensure that the number of the samples used to derive the linear model parameters is a power of 2, the number of adjacent samples used for deriving the model parameters can be increased or decreased.

Figure 6:
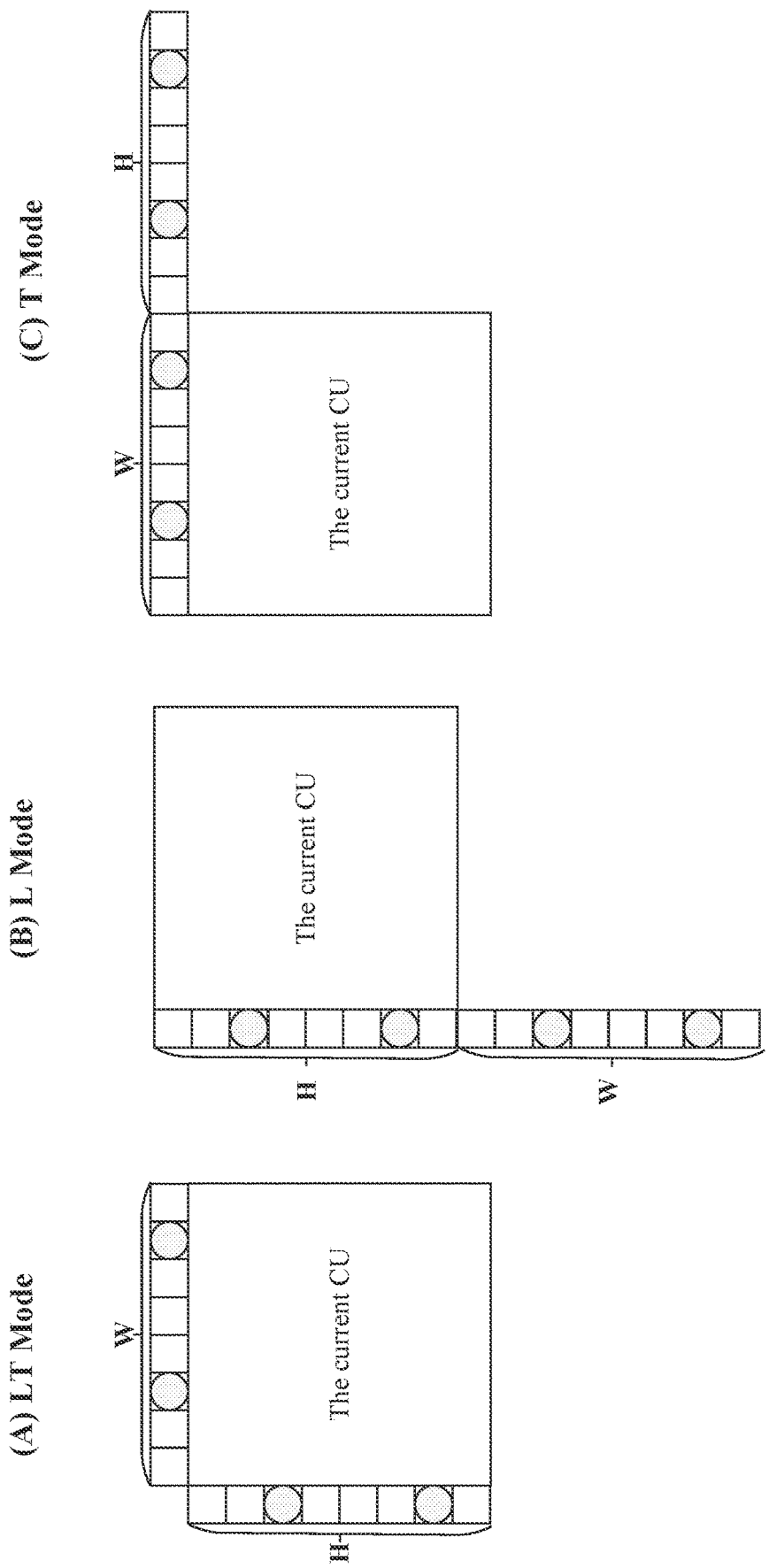
FIG. 6 is a schematic diagram illustrating another example method for using adjacent samples to derive parameters of a cross-component model, according to some embodiments of the present disclosure.

For example, to reduce the computational complexity, only four adjacent samples may be used to derive the model parameters. FIG. 6 is a schematic diagram illustrating a method for using adjacent samples to derive model parameters, according to some embodiments of the present disclosure. In FIG. 6, the adjacent samples used for deriving the model parameters are shown as circles. As shown in FIG. 6A, for a W×H chroma block (e.g., an 8×8 chroma CU), the four adjacent samples used in the CCLM_LT mode are samples located at the positions of W/4 and 3W/4 at the top boundary and at the positions of H/4 and 3H/4 at the left boundary. As shown in FIG. 6B, for the CCLM_L mode, the left boundary is extended to a size of (W+H) samples, and the four samples used for the model parameter derivation are located at the positions (W+H)/8, 3(W+H)/8, 5(W+H)/8 and 7(W+H)/8. As shown in FIG. 6C, for the CCLM_T mode, the top boundary is extended to a size of (W+H) samples, and the four samples used for the model parameter derivation are located at the positions (W+H)/8, 3(W+H)/8, 5(W+H)/8 and 7(W+H)/8.

The four reconstructed down-sampled adjacent luma samples at the selected positions are compared four times to find two smaller values: $L_{min}^0$ and $L_{min}^1$, and two larger values: $L_{max}^0$ and $L_{max}^1$. Their corresponding reconstructed chroma sample values are denoted as $C_{min}^0$, $C_{min}^1$, $C_{max}^0$ and $C_{max}^1$. Then $L_{min}$, $L_{max}$, $C_{min}$ and $C_{max}$ are derived as:

$$L_{min} = (L_{min}^0 + L_{min}^1 + 1) \gg 1 \quad \text{(Eq. 10-1)}$$

$$L_{max} = (L_{max}^0 + L_{max}^1 + 1) \gg 1 \quad \text{(Eq. 10-1)}$$

$$C_{min} = (C_{min}^0 + C_{min}^1 + 1) \gg 1 \quad \text{(Eq. 10-1)}$$

$$C_{max} = (C_{max}^0 + C_{max}^1 + 1) \gg 1 \quad \text{(Eq. 10-1)}$$

Finally, the linear model coefficients $\alpha$ and $\beta$ are obtained according to the following equations.

$$\alpha = \frac{C_{max} - C_{min}}{L_{max} - L_{min}} \quad \text{(Eq. 11)}$$

$$\beta = C_{min} - \alpha \cdot L_{min} \quad \text{(Eq. 12)}$$

The division operation to calculate parameter $\alpha$ is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

DivTable [ ]={0, 7, 6, 5, 5, 4, 4, 3, 3, 2, 2, 1, 1, 1, 1, 0} (Eq. 13)

This would have a benefit of both reducing the complexity of the calculation as well as the memory size required for storing the needed tables.

In the disclosed embodiments, multi-model CCLM can be used. CCLM can be extended by adding three Multi-model CCLM (MMLM) modes, MMLM_LT, MMLM_L and MMLM_T. The difference among the three modes is the same as the difference among CCLM_LT, CCLM_L and CCLM_T modes, that is the locations of the reconstructed adjacent samples that are used for linear model parameters ($\alpha$ and $\beta$) derivation. In each MMLM mode, there can be more than one linear model between luma and chroma in a block. First, the reconstructed adjacent samples are classified into two classes using a threshold which is the average of the values of the luma reconstructed adjacent samples. Then each class is treated as an independent training set to derive a linear model, using the aforementioned LMMSE method. Subsequently, the reconstructed luma samples of the current block are also classified based on the same rule. Finally, the chroma samples are predicted by the reconstructed luma samples differently in different classes.

In the disclosed embodiments, a Gradient Linear Model (GLM) method can be used. Compared with CCLM, instead of down-sampling the reconstructed luma samples, the GLM utilizes luma sample gradients to derive the linear model. In other words, rather than using the filters in Equations 4-6, a gradient G is used in the CCLM process. The other designs of CCLM (e.g., parameter derivation, prediction sample linear transform) are kept unchanged. The gradient G can be calculated by one of four Sobel based gradient patterns:

$$g1 = \begin{pmatrix} 1 & 0 & -1 \\ 1 & 0 & -1 \end{pmatrix} \quad \text{(Eq. 14)}$$

$$g2 = \begin{pmatrix} 1 & 2 & 1 \\ -1 & -2 & -1 \end{pmatrix} \quad \text{(Eq. 15)}$$

$$g3 = \begin{pmatrix} 2 & 1 & -1 \\ 1 & -1 & -2 \end{pmatrix} \quad \text{(Eq. 16)}$$

$$g4 = \begin{pmatrix} -1 & 1 & 2 \\ -2 & -1 & 1 \end{pmatrix} \quad \text{(Eq. 17)}$$

By using the aforementioned gradient patterns, the gradient G can be calculated by the following formulas, where Equation 18, Equation 19, Equation 20 and Equation 21 correspond to the gradient patterns in Equation 14, Equation 15, Equation 16 and Equation 17, respectively.

$$G_L(i, j) = \begin{bmatrix} rec_L(2i-1, 2j) - rec_L(2i+1, 2j) + \\ rec_L(2i-1, 2j+1) - rec_L(2i+1, 2j+1) \end{bmatrix} \quad \text{(Eq. 18)}$$

$$G_L(i, j) = \quad \text{(Eq. 19)}$$
$$\begin{bmatrix} rec_L(2i-1, 2j) + 2 \cdot rec_L(2i, 2j) + rec_L(2i+1, 2j) - \\ rec_L(2i-1, 2j+1) - 2 \cdot rec_L(2i, 2j+1) - rec_L(2i+1, 2j+1) \end{bmatrix}$$

$$G_L(i, j) = \quad \text{(Eq. 20)}$$
$$\begin{bmatrix} 2 \cdot rec_L(2i-1, 2j) + rec_L(2i, 2j) - rec_L(2i+1, 2j) + \\ rec_L(2i-1, 2j+1) - rec_L(2i, 2j+1) - 2 \cdot rec_L(2i+1, 2j+1) \end{bmatrix}$$

$$G_L(i, j) = \quad \text{(Eq. 21)}$$
$$\begin{bmatrix} -rec_L(2i-1, 2j) + rec_L(2i, 2j) + 2 \cdot rec_L(2i+1, 2j) - \\ 2 \cdot rec_L(2i-1, 2j+1) - rec_L(2i, 2j+1) + rec_L(2i+1, 2j+1) \end{bmatrix}$$

The linear model parameters a and are derived based on reconstructed adjacent chroma samples and the corresponding gradient G of the collocated reconstructed luma samples at both encoder and decoder side by the same method of the CCLM, e.g., LMMSE method. Then a chroma samples of a block can be predicted from the gradient of collocated reconstructed luma samples by a linear model as:

$$pred_c(i, j) = \alpha \cdot G_L(i, j) + \beta \quad \text{(Eq. 22)}$$

For signaling, when the CCLM mode is enabled to the current CU, two flags are signaled separately for Cb and Cr component to indicate whether GLM is enabled to the component; if the GLM is enabled for one component, one syntax element is further signaled to select one of four gradient patterns for gradient calculation. In some embodiments, a two-bits fixed-length code is used to code the syntax element.

In some embodiments, the GLM is only available for some of the CCLM modes. For example, the GLM is only available for CCLM_LT mode, that is, for CCLM_LT mode, some syntax elements are signaled to indicate whether GLM is enabled and which gradient pattern is used. If GLM is enabled for the CCLM_LT mode, the gradient G of the above and left adjacent reconstructed luma samples is used to replace the down-sampled reconstructed adjacent luma samples in the linear model parameters derivation process, and only a signal linear model is used in the current block. If GLM is disabled for the CCLM_LT mode, the original CCLM_LT mode is applied. For other CCLM modes (i.e., CCLM_L, CCLM_T and three MMLM modes), there is no change. For another example, the GLM is only available for CCLM_LT mode and MMLM_LT mode. For another example, the GLM is only available for CCLM_LT mode, CCLM_L mode and CCLM_T mode. For another example, the GLM is available for all the six CCLM modes.

When the GLM is applied to an MMLM mode, a multi-model GLM (MMGLM) method is used. In the MMGLM mode, there can be more than one linear model between gradient G and chroma samples in a block. In implementing the MMGLM method, the gradients of the reconstructed adjacent samples are first classified into two classes using a threshold which is the average of the values of the gradients of the luma reconstructed adjacent samples. Then each class is treated as an independent training set to derive a linear model, using the above-described LMMSE method. Subsequently, the gradients of the reconstructed luma samples of the current block are also classified based on the same rule. Finally, the chroma samples are predicted by the gradients of the reconstructed luma samples differently in different classes.

In some embodiments, 16 gradient patterns are supported for the GLM method. That is, the gradient G can be calculated by one of the 16 gradient patterns according to the following formulas. A syntax element is signaled to indicate which of the 16 gradient patterns is/are used.

$$g1 = \begin{pmatrix} 1 & 0 & -1 \\ 1 & 0 & -1 \end{pmatrix} \quad \text{(Eq. 23)}$$

$$g2 = \begin{pmatrix} 1 & 2 & 1 \\ -1 & -2 & -1 \end{pmatrix} \quad \text{(Eq. 24)}$$

$$g3 = \begin{pmatrix} 2 & 1 & -1 \\ 1 & -1 & -2 \end{pmatrix} \quad \text{(Eq. 25)}$$

$$g4 = \begin{pmatrix} -1 & 1 & 2 \\ -2 & -1 & 1 \end{pmatrix} \quad \text{(Eq. 26)}$$

$$g5 = \begin{pmatrix} 0 & 2 & -2 \\ 0 & 1 & -1 \end{pmatrix} \quad \text{(Eq. 27)}$$

$$g6 = \begin{pmatrix} 1 & 1 & 1 \\ -1 & -1 & -1 \end{pmatrix} \quad \text{(Eq. 28)}$$

$$g7 = \begin{pmatrix} 1 & 1 & -1 \\ 1 & -1 & -1 \end{pmatrix} \quad \text{(Eq. 29)}$$

$$g8 = \begin{pmatrix} -1 & 1 & 1 \\ -1 & -1 & 1 \end{pmatrix} \quad \text{(Eq. 30)}$$

$$g9 = \begin{pmatrix} 0 & 1 & -1 \\ 0 & 1 & -1 \end{pmatrix} \quad \text{(Eq. 31)}$$

$$g10 = \begin{pmatrix} 0 & 1 & 1 \\ 0 & -1 & -1 \end{pmatrix} \quad \text{(Eq. 32)}$$

$$g11 = \begin{pmatrix} 1 & 1 & 0 \\ 0 & -1 & -1 \end{pmatrix} \quad \text{(Eq. 33)}$$

$$g12 = \begin{pmatrix} 0 & 1 & 1 \\ -1 & -1 & 0 \end{pmatrix} \quad \text{(Eq. 34)}$$

-continued $$g13 = \begin{pmatrix} 1 & -1 & 0 \\ 1 & -1 & 0 \end{pmatrix} \quad \text{(Eq. 35)}$$

$$g14 = \begin{pmatrix} 1 & 1 & 0 \\ -1 & -1 & 0 \end{pmatrix} \quad \text{(Eq. 36)}$$

$$g15 = \begin{pmatrix} 1 & 2 & 0 \\ 0 & -2 & -1 \end{pmatrix} \quad \text{(Eq. 37)}$$

$$g16 = \begin{pmatrix} 0 & 2 & 1 \\ -1 & -2 & 0 \end{pmatrix} \quad \text{(Eq. 38)}$$

In some embodiments, the down-sampled reconstructed luma samples and the gradients of the reconstructed luma samples are used together to derive the linear model. The linear model parameters $\alpha$ and $\beta$ are derived based on reconstructed adjacent chroma samples and the corresponding gradients G of the collocated reconstructed luma samples and the down-sampled reconstructed luma samples, at both encoder and decoder side by the same method of the CCLM, e.g., LMMSE method. The values of the down-sampled reconstructed luma samples can be obtained by one of the above described down-sampled filters. Then chroma samples of a block can be predicted from the gradients of the collocated reconstructed luma samples and the values of the down-sampled reconstructed luma samples by a linear model as:

$$\text{pred}_c(i, j) = \alpha \cdot (G_L(i, j) + \text{rec}'_L(i, j)) + \beta \quad \text{(Eq. 39)}$$

In some embodiments, a flag is signaled to indicate which GLM method in Equations 23-38 is used.

In the study of video coding technologies, it has been noticed that there are correlations among different color components. CCLM assumes that there is a linear correlation between a chroma sample and a luma sample at the corresponding position in a coding block. However, this linear relationship may not be suitable for all coding blocks. Sometimes, even for local texture, there may have more complex relationship between luma and chroma, and in this case, it may be more suitable to use a nonlinear relationship for assuming.

Moreover, in the GLM method, the chroma samples are predicted by constructing the relationship between the gradients of the reconstructed luma samples and the chroma samples. However, this method may have difficulty in accurately predicting chroma samples when the gradients of the reconstructed luma samples of the current block are very close. Even though the values of the down-sampled reconstructed luma samples are introduced in the GLM method corresponding to Equation 39, these values always have the same parameters with the gradients of the reconstructed luma samples, which is not suitable in some cases.

In this disclosure, it is proposed to predict chroma samples of a block from the collocated reconstructed luma samples by using a non-linear model.

In the exemplary embodiments, a Cross-Component Non-Linear Model (CCNLM) is used to predict a chroma sample of the current block from the down-sampled reconstructed luma sample as shown in Equation 40.

$$\text{pred}_c(i, j) = n \cdot (\text{rec}'_L(i, j))^n + a_{n-1} \cdot (\text{rec}'_L(i, j))^{n-1} + \ldots + a_1 \cdot \text{rec}'_L(i, j) + a_0 \quad \text{(Eq. 40)}$$

where $\text{pred}_c(i,j)$ represents the predicted values of the chroma samples in the current block and $\text{rec}'_L(i, j)$ represents the reconstructed values of the collocated luma samples of the same block which are down-sampled for the case of non-4:4:4 color format; $(i, j)$ is the coordinate of a sample in the block; coefficients $a_0, \ldots, a_n$ are non-linear model parameters which can represent a non-linear model; the value of n can be any positive integer which is grater than 1, e.g. n=2.

According to some embodiments, some items in Equation 40 can be removed. For example, when the value of n is equal to 2 and the item with the power of 1 is removed, Equation 40 can be rewritten as:

$$\text{pred}_c(i, j) = a_2 \cdot (\text{rec}'_L(i, j))^2 + a_0 \quad \text{(Eq. 41)}$$

According to some embodiments, in order to make the coefficients of each term are of a similar order of magnitude, each term can be multiplied by a different adjustment factor as:

$$\text{pred}_c(i, j) = a_n \cdot \text{factor}_n \cdot (\text{rec}'_L(i, j))^n + a_{n-1} \cdot \text{factor}_{n-1} \cdot (\text{rec}'_L(i, j))^{n-1} + \ldots + a_1 \cdot \text{factor}_1 \cdot \text{rec}'_L(i, j) + a_0 \cdot \text{factor}_0 \quad \text{(Eq. 42)}$$

For example, $\text{factor}_0 = \text{bitDepth}/2$, $\text{factor}_1 = 1$, $\text{factor}_m = 1/\text{bitDepth}^{m-1}(1 < m <= n)$. Here, the bit depth refers to the number of bits used for indicating the color of a picture.

According to some embodiments, some coefficients in Equation 40 are limited to be the same. For example, when the value of n is equal to 2 and the item with the power of 1 and the item with the power of 2 have the same coefficients, then Equation 40 can be rewritten as:

$$\text{prec}_c(i, j) = a_2 \cdot ((\text{rec}'_L(i, j))^2 + \text{rec}'_L(i, j)) + a_0 \quad \text{(Eq. 43)}$$

According to some embodiments, the aforementioned embodiments can be combined freely. For example, the value of n is equal to 2 and each term is multiplied by a different adjustment factor as Equation 44, where $\text{factor}_0 = \text{bitDepth}/2$, $\text{factor}_1 = 1$, $\text{factor}_2 = 1/\text{bitDepth}$. For another example, the value of n is equal to 2 and each term is multiplied by a different adjustment factor and the item with the power of 1 and the item with the power of 2 have the same coefficients as Equation 45, where $\text{factor}_0 = \text{bitDepth}/2$, $\text{factor}_1 = 1$, $\text{factor}_2 = 1/\text{bitDepth}$.

$$\text{pred}_c(i, j) = a_2 \cdot (\text{rec}'_L(i, j))^2 \cdot \text{factor}_2 + a_1 \cdot \text{rec}'_L(i, j) \cdot \text{factor}_1 + a_0 \cdot \text{factor}_0 \quad \text{(Eq. 44)}$$

$$\text{pred}_c(i, j) = a_2 \cdot ((\text{rec}'_L(i, j))^2 \cdot \text{factor}_2 + \text{rec}'_L(i, j) \cdot \text{factor}_1) + a_0 \cdot \text{factor}_0 \quad \text{(Eq. 45)}$$

According to some embodiments, the model parameters $a_0, \ldots, a_n$ are derived based on the original chroma samples in the current block and the collocated original luma samples of the same block which are down-sampled for the case of non-4:4:4 color format at encoder and signaled to the bitstream. At decoder, the model parameters $a_0, \ldots, a_n$ are decoded from the bitstream.

According to some embodiments, the model parameters $a_0, \ldots, a_n$ are derived based on reconstructed adjacent chroma samples and their corresponding reconstructed luma samples which are down-sampled for the case of non-4:4:4 color format at both encoder and decoder side to avoid any signaling overhead.

For example, the adjacent samples used to derive the non-linear model parameters in the proposed method can be the same as the adjacent samples used to derive the linear model parameters in the aforementioned CCLM method.

For another example, the adjacent samples used to derive the non-linear model parameters in the proposed method can be the reconstructed samples in the x adjacent lines and columns to the current block, where x can be any positive integer, e.g., x=3.

For another example, a subset of the adjacent samples is used to derive the non-linear model parameters in the proposed method, e.g., 4 samples.

According to some embodiments, the model parameters $a_0, \ldots, a_n$ are derived by a Least Mean Square (LMS) method. The LMS method derives the parameters $a_0, \ldots, a_n$ by minimizing the Mean Square Error (MSE) between the predicted and reconstructed values of the adjacent chroma samples. Specifically, initial values of the parameters $a_0, \ldots, a_n$ can be used to derive predicted values of the adjacent chroma samples. Then, the values of the parameters $a_0, \ldots, a_n$ can be adjusted by minimizing the MSE between the predicted and reconstructed values of the adjacent chroma samples.

For example, a gradient descent method can be used to minimizing the MSE. As understood in the art, the gradient descent method is an iterative first-order optimization algorithm capable of finding a local minimum/maximum of a given function, e.g., the MSE between the predicted and reconstructed values of the adjacent chroma samples.

For another example, the system of equations for optimizing partial derivatives of the MSE is written as matrix multiplication form which contains a system of linear equations, and the model parameters can be derived by solving the linear equations by Gaussian elimination method.

For another example, the autocorrelation matrix for the reconstructed values of the down-sampled adjacent luma samples and a cross-correlation vector between the reconstructed values of the down-sampled adjacent luma samples and reconstructed values of the adjacent chroma samples are calculated. Autocorrelation matrix is LU decomposed or LDL decomposed or Cholesky decomposed and the parameters $a_0, \ldots, a_n$ are calculated using back-substitution.

According to some embodiments, similar to the aforementioned CCLM methods, when adjacent samples are used to derive the model parameters $a_0, \ldots, a_n$, the proposed CCNLM method can support different modes based on the locations of the adjacent samples. For example, three CCNLM modes, CCNLM_LT, CCNLM_L and CCNLM_T, are supported. These three modes differ with respect to the locations of the reconstructed adjacent samples that are used for non-linear model parameters $(a_0, \ldots, a_n)$ derivation. The above reconstructed adjacent samples are involved in the CCNLM_T mode and the left reconstructed adjacent samples are involved in the CCNLM_L mode. In the CCNLM_LT mode, both above and left reconstructed adjacent samples are used.

According to some embodiments, similar to the aforementioned CCLM methods, a Multi-Models CCNLM (MMNLM) method is proposed. Specifically, there can be more than one non-linear model between luma and chroma in a block. For example, the adjacent samples are used to derive the model parameters. First, the reconstructed adjacent samples are classified into two classes using a threshold, e.g., the average of the values of the luma reconstructed adjacent samples. Then each class is treated as an independent training set to derive a non-linear model, using the aforementioned methods. Subsequently, the reconstructed luma samples of the current block are also classified based on the same rule. Finally, the chroma samples are predicted by the reconstructed luma samples differently in different classes.

In some embodiments, the MMNLM can support different modes based on the locations of the adjacent samples, when adjacent samples are used to derive the model parameters $a_0, \ldots, a_n$. For example, three MMNLM modes, MMNLM_LT, MMNLM_L and MMNLM_T, are supported. These three modes differ with respect to the locations of the reconstructed adjacent samples that are used for non-linear model parameters $(a_0, \ldots, a_n)$ derivation. The above reconstructed adjacent samples are involved in the MMNLM_T mode and the left reconstructed adjacent samples are involved in the MMNLM_L mode. In the MMNLM_LT mode, both above and left reconstructed adjacent samples are used.

According to some embodiments, six CCLM modes are supported: CCLM_LT, CCLM_L, CCLM_T, MMLM_LT, MMLM_L and MMLM_T. In the disclosed embodiments, various modes of the proposed CCNLM may be used to replace some or all of the CCLM modes.

According to some embodiments, the proposed CCNLM is used to replace all the aforementioned CCLM modes. That is, six CCNLM modes, CCNLM_LT, CCNLM_L, CCNLM_T, MMNLM_LT, MMNLM_L and MMNLM_T, are used to replace the six CCLM modes, respectively. And there is no additional syntax signaling.

According to some embodiments, the proposed CCNLM is used to replace some of the aforementioned CCLM modes.

For example, the proposed CCNLM is used to replace the CCLM_LT mode. So that CCNLM_LT, CCLM_L, CCLM_T, MMLM_LT, MMLM_L and MMLM_T are supported. For the CCNLM_LT mode, the non-linear model between luma and chroma is derived and for other modes the linear model is derived.

For another example, the proposed CCNLM is used to replace the CCLM_LT mode and MMLM_LT mode. So that CCNLM_LT, CCLM_L, CCLM_T, MMNLM_LT, MMLM_L and MMLM_T are supported. For the CCNLM_LT mode and MMLM_LT mode, the non-linear model between luma and chroma is derived and for other modes the linear model is derived.

For another example, the proposed CCNLM is used to replace the CCLM_LT mode, CCLM_L mode and CCLM_T mode. So that CCNLM_LT, CCNLM_L, CCNLM_T, MMLM_LT, MMLM_L and MMLM_T are supported. For the CCNLM_LT mode, CCNLM_L mode and CCNLM_T mode, the non-linear model between luma and chroma is derived and for other modes the linear model is derived.

According to some embodiments, an explicit signaling method is used to decide whether to use the proposed CCNLM method, that is, whether to use a linear model or a non-linear model. For example, after signaling the CCLM mode, a flag is signaled to indicate whether to use the proposed CCNLM method. In other words, first some syntax elements are signaled to indicate the position of the adjacent samples used in model parameters derivation (LT, L or T) and whether to use a single model or dual models in the current block, then a flag is signaled to indicate whether to use a linear model or a non-linear model.

According to some embodiments, only some of the six CCNLM modes are supported with the explicit signaling method.

According to some embodiments, two flags are signaled to indicate whether to use the proposed CCNLM method for Cb and Cr, respectively.

According to some embodiments, an implicit method is used to decide whether to use the proposed CCNLM method, that is, whether to use a linear model or a non-linear model.

For example, based on the reconstructed adjacent samples, both the linear model and the proposed non-linear model are derived. Then, the two models are used to predict the adjacent chroma samples from the reconstructed adjacent luma samples, respectively. The predicted values obtained by the two types of models are used to calculate the sum of absolute differences (SAD) or sum of absolute transformed differences (SATD) between the reconstructed values of the adjacent chroma samples, respectively. Finally, the model with smaller SAD or SATD is used to predict the chroma samples of the current block.

For another example, the gradients of the adjacent luma samples and the adjacent chroma samples are used to decide whether to use a linear model or a non-linear model.

For another example, the size of the current chroma block is used to decide whether to use a linear model or a non-linear model. For example, if the area of the current chroma block is greater than a threshold (e.g., 256), the non-linear model is used; otherwise, the linear model is used.

In the disclosed embodiments, the CCNLM method can be combined with the GLM method. According to some embodiments, the proposed CCNLM method is combined with the GLM method, where a chroma sample of the current block is predicted from the gradient G of the collocated reconstructed luma samples as shown in Equation 46.

$$\text{pred}_c(i, j) = a_n \cdot (G_L(i, j))^n + a_{n-1} \cdot (G_L(i, j))^{n-1} + \ldots + a_1 \cdot G_L(i, j) + a_0 \quad \text{(Eq. 46)}$$

where $\text{pred}_c(i, j)$ represents the predicted values of the chroma samples in the current block and $G_L(i, j)$ represents the corresponding gradient G of the collocated reconstructed luma samples of the same block; (i, j) is the coordinate of a sample in the block; coefficients $a_0, \ldots a_n$ are non-linear model parameters which can represent a non-linear model; the value of n can be any positive integer which is grater than 1, e.g. n=2.

According to some embodiments, some items in Equation 46 can be removed. For example, when the value of n is equal to 2 and the item with the power of 1 is removed, Equation 46 can be rewritten as:

$$\text{pred}_c(i, j) = a_2 \cdot (G_L(i, j))^2 + a_0 \quad \text{(Eq. 47)}$$

According to some embodiments, in order to make the coefficients of each term in Equation 46 to be of a similar order of magnitude, each term can be multiplied by a different adjustment factor as:

$$\text{pred}_c(i, j) = a_n \cdot \text{factor}_n \cdot (G_L(i, j))^n + a_{n-1} \cdot \text{factor}_{n-1} \cdot (G_L(i, j))^{n-1} + \ldots + a_1 \cdot \text{factor}_1 \cdot G_L(i, j) + a_0 \cdot \text{factor}_0 \quad \text{(Eq. 48)}$$

For example, $\text{factor}_0 = \text{bitDepth}/2$, $\text{factor}_1 = 1$, $\text{factor}_m = 1/\text{bitDepth}^{m-1}$ ($1 < m <= n$).

According to some embodiments, in some items in Equation 46, the gradient $G_L(i, j)$ can be replaced by a down-sampled reconstructed value of the collocated luma sample $\text{rec}'_L(i, j)$. The $\text{rec}'_L(i, j)$ can be obtained by one of the aforementioned down-sampled filters.

For example, only the G(i, j) in the highest-order term is replaced by $\text{rec}'_L(i, j)$:

$$\text{pred}_c(i, j) = a_n \cdot (\text{rec}'_L(i, j))^n + a_{n-1} \cdot (G_L(i, j))^{n-1} + \ldots + a_1 \cdot G_L(i, j) + a_0 \quad \text{(Eq. 49)}$$

For another example, only the G(i, j) in the lowest-order term is replaced by $\text{rec}'_L(i, j)$:

$$\text{pred}_c(i, j) = a_n \cdot (G_L(i, j))^n + a_{n-1} \cdot (G_L(i, j))^{n-1} + \ldots + a_1 \cdot \text{rec}'_L(i, j) + a_0 \quad \text{(Eq. 50)}$$

For another example, only the G(i, j) in the lowest-order term is not replaced by $\text{rec}'_L(i, j)$ and for other terms the G(i, j) is replaced by $\text{rec}'_L(i, j)$:

$$\text{pred}_c(i, j) = a_n \cdot (\text{rec}'_L(i, j))^n + a_{n-1} \cdot (\text{rec}'_L(i, j))^{n-1} + \ldots + a_1 \cdot G_L(i, j) + a_0 \quad \text{(Eq. 51)}$$

According to some embodiments, in some items in Equation 46, the gradient $G_L(i,j)$ can be replaced by a reconstructed value of the collocated luma sample $\text{rec}_L(2i, 2j)$.

According to some embodiments, the aforementioned four embodiments can be freely combined.

For example, n is equal to 2, the adjustment factors are used and $\text{factor}_0 = \text{bitDepth}/2$, $\text{factor}_1 = 1$, $\text{factor}_2 = 1/\text{bitDepth}$:

$$\text{pred}_c(i, j) = a_2 \cdot (G_L(i, j))^2 / \text{bitDepth} + a_1 \cdot G_L(i, j) + a_0 \cdot \text{bitDepth}/2 \quad \text{(Eq. 52)}$$

For another example, in the above example, the G(i, j) in the highest-order term is replaced by $\text{rec}'_L(i, j)$:

$$\text{pred}_c(i, j) = a_2 \cdot (\text{rec}'_L(i, j))^2 / \text{bitDepth} + a_1 \cdot G_L(i, j) + a_0 \cdot \text{bitDepth}/2 \quad \text{(Eq. 53)}$$

The samples used to derive the non-linear models can be the original chroma samples in the current block and the collocated original luma samples of the same block which are down-sampled for the case of non-4:4:4 color format at encoder and signaled to the bitstream. Alternatively, the samples used to derive the non-linear models can be the reconstructed adjacent chroma samples and their corresponding luma samples which are down-sampled for the case of non-4:4:4 color format at both encoder and decoder side to avoid any signaling overhead.

The non-linear model derivation method can be one of the Least Mean Square (LMS) method described above.

According to some embodiments, the proposed CCNLM method is always combined with the GLM method. That is, when the GLM method is used to a chroma block, a non-linear model is used to predict the chroma samples.

According to some embodiments, an explicit signaling method is used to decide whether to combine the proposed CCNLM method with the GLM method, that is, whether to use a linear model or a non-linear model for GLM. For example, after signaling the GLM flag, if the GLM mode is enabled, a flag is further signaled to indicate whether to use the non-linear model.

According to some embodiments, an implicit method is used to decide whether to combine the proposed CCNLM method with the GLM method, that is, whether to use a linear model or a non-linear model for GLM. For example, the implicit method may be above-described implicit method used to decide whether to use the proposed CCNLM method, that is, whether to use a linear model or a non-linear model.

According to some embodiments, the proposed CCNLM method can only combined with some GLM modes. For example, the GLM method is available for CCLM_LT mode, CCLM_L mode and CCLM_T mode, and the CCNLM can only be combined with GLM when the CCLM_LT mode is selected. For another example, the GLM method is available for all the six CCLM modes, and the CCNLM can only be combined with GLM when the CCLM_LT mode is selected.

According to some embodiments, the aforementioned embodiments can be freely combined.

For example, the GLM is only available for CCLM_LT mode, and when GLM is enabled, the proposed CCNLM method is always combined with the GLM method as Equation 52. The LDL decomposed method is used to derive the non-linear parameters from the reconstructed adjacent chroma samples and the gradients of the reconstructed adjacent luma samples.

The present disclosure also provides a new GLM method, where a chroma sample of the current block is predicted from the gradients G of the collocated reconstructed luma samples and the down-sampled reconstructed luma samples. The prediction is based on Equation 54:

$$\text{pred}_c(i, j) = a_2 \cdot G_L(i, j) + a_1 \cdot \text{rec}'_L(i, j) + a_0 \quad \text{(Eq. 54)}$$

where $\text{pred}_c(i, j)$ represents the predicted values of the chroma samples in the current block, $G_L(i, j)$ represents the corresponding gradients G of the collocated reconstructed luma samples of the same block and $\text{rec}'_L(i, j)$ represents the reconstructed values of the collocated luma samples of the same block which are down-sampled for the case of non-4:4:4 color format by one of the aforementioned down-sampled filters; (i, j) is the coordinate of a sample in the block; coefficients $a_2$, $a_1$ and $a_0$ are model parameters which can represent the relationship among $\text{pred}_c(i, j)$, $G_L(i, j)$ and $\text{rec}'_L(i, j)$.

In some embodiments, another GLM method is proposed as shown in Equation 55:

$$\text{pred}_c(i, j) = a_2 \cdot (G_L(i, j) + \text{rec}'_L(i, j)) + a_1 \cdot \text{rec}'_L(i, j) + a_0 \quad \text{(Eq. 55)}$$

The coefficients in the GLM methods respectively corresponding to Equations 54 and 55 can be derived based on the values of the reconstructed adjacent chroma samples, the corresponding gradients G of the collocated reconstructed adjacent luma samples, and the values of the corresponding reconstructed adjacent luma samples. The derivation is performed at both encoder and decoder side by one of the above-described methods of using Least Mean Square (LMS) to derive the model parameters. For example, the Gaussian elimination method or the LDL decomposed method can be used to derive the coefficients.

In some embodiments, only one of the aforementioned GLM methods is supported.

For example, the GLM method corresponding to Equation 54 is supported. For a chroma block, a flag is signaled in the bitstream to indicate whether GLM is used or not. If this flag indicates that GLM is used, the chroma samples in the current block are predicted using the GLM method corresponding to Equation 54.

In some embodiments, two GLM methods are supported, and a flag is signaled to indicate which of the two GLM methods is used.

In one example, the GLM methods corresponding to Equation 22 and Equation 54 are supported. For a chroma block, a flag is signaled in the bitstream to indicate whether GLM is used or not. If this flag indicates that GLM is used, another flag is signaled to indicate which of the two GLM methods respectively corresponding to Equation 22 and Equation 54 is used to predict the chroma samples in the current block.

In another example, the GLM methods respectively corresponding to Equation 39 and Equation 54 are supported.

In another example, the GLM methods respectively corresponding to Equation 54 and Equation 55 are supported.

In some embodiments, three GLM methods are supported, and a syntax element is signaled to indicate which of the GLM method is used.

For example, the GLM methods respectively corresponding to Equation 22, Equation 39, and Equation 54 are supported. For a chroma block, a flag is signaled in the bitstream to indicate whether GLM is used or not. If this flag indicates that GLM is used, a syntax element is signaled to indicate which of the three GLM methods respectively corresponding to Equation 22, Equation 39, and Equation 54 is used to predict the chroma samples in the current block.

In some embodiments, four GLM methods are supported, and a syntax element is signaled to indicate which of the GLM method is used.

For example, the GLM methods respectively corresponding to Equation 22, Equation 39, Equation 54, and Equation 55 are supported. For a chroma block, a flag is signaled in the bitstream to indicate whether GLM is used or not. If this flag indicates that GLM is used, a syntax element is signaled to indicate which of the three GLM methods respectively corresponding to Equation 22, Equation 39, Equation 54, and Equation 55 is used to predict the chroma samples in the current block.

In some embodiments, for the two GLM methods respectively corresponding to Equation 54 and Equation 55, each term can be multiplied by a different adjustment factor according to Equation 56 and Equation 57, respectively. For example, $\text{factor}_2$ is equal to 1, $\text{factor}_1$ is equal to 1 and $\text{factor}_0$ is equal to 512.

$$\text{pred}_c(i, j) = a_2 \cdot \text{factor}_2 \cdot G_L(i, j) + a_1 \cdot \text{factor}_1 \cdot \text{rec}'_L(i, j) + a_0 \cdot \text{factor}_0 \quad \text{(Eq. 56)}$$

$$\text{pred}_c(i, j) = a_2 \cdot \text{factor}_2 \cdot (G_L(i, j) + \text{rec}'_L(i, j)) + a_1 \cdot \text{factor}_1 \cdot \text{rec}'_L(i, j) + a_0 \cdot \text{factor}_0 \quad \text{(Eq. 57)}$$

In some embodiments, the value of the down-sampled reconstructed luma sample $\text{rec}'_L(i, j)$ in the GLM method corresponding to Equation 54 can be replaced by the n-th power of the value of the down-sampled reconstructed luma sample $(\text{rec}'_L(i, j))^n$ as Equation 58:

$$\text{pred}_c(i, j) = a_2 \cdot G_L(i, j) + a_1 \cdot (\text{rec}'_L(i, j))^n + a_0 \quad \text{(Eq. 58)}$$

In some embodiments, the value of the down-sampled reconstructed luma sample $\text{rec}'_L(i, j)$ in the GLM method corresponding to Equation 55 can be replaced by the n-th power of the value of the down-sampled reconstructed luma sample $(\text{rec}'_L(i, j))^n$.

In one example, only the $\text{rec}'_L(i, j)$ in the first item is replaced by $(\text{rec}'_L(i, j))^n$ as:

$$\text{pred}_c(i, j) = a_2 \cdot (G_L(i, j) + (\text{rec}'_L(i, j))^n) + a_1 \cdot \text{rec}'_L(i, j) + a_0 \quad \text{(Eq. 59)}$$

In another example, only the $\text{rec}'_L(i, j)$ in the second item is replaced by $(\text{rec}'_L(i, j))^n$ as:

$$\text{pred}_c(i, j) = a_2 \cdot (G_L(i, j) + \text{rec}'_L(i, j)) + a_1 \cdot (\text{rec}'_L(i, j))^n + a_0 \quad \text{(Eq. 60)}$$

In another example, all the $\text{rec}'_L(i, j)$ in the first and second terms are replaced by $(\text{rec}'_L(i, j))^n$ as:

$$\text{pred}_c(i, j) = a_2 \cdot (G_L(i, j) + (\text{rec}'_L(i, j))^n) + a_1 \cdot (\text{rec}'_L(i, j))^n + a_0 \quad \text{(Eq. 61)}$$

In some embodiments, the value of the down-sampled reconstructed luma sample $\text{rec}'_L(i, j)$ in the two GLM methods respectively corresponding to Equation 54 and Equation 55 can be replaced by the value of the reconstructed luma sample. For example, for 4:2:0 color format video sequences, the $\text{rec}_L(2i, 2j)$ can be used to replace the $\text{rec}'_L(i, j)$, where (i, j) is the coordinate of a sample in the current chroma block.

In the aforementioned GLM methods, the gradient G can be calculated by one of the four Sobel based gradient patterns as shown in Equations 14-17 or one of the 16 gradient patterns as shown in Equations 23-38.

In some embodiments, another new GLM method is proposed, in which a chroma sample of the current block is predicted from multiple gradients of the collocated reconstructed luma samples as shown in Equation 62:

$$\text{pred}_c(i, j) = a_n \cdot G_{LK}(i, j) + \ldots + a_1 \cdot G_{L1}(i, j) + a_0 \quad \text{(Eq. 62)}$$

where $\text{pred}_c(i, j)$ represents the predicted values of the chroma samples in the current block; $G_{L1}(i, j)$ represent k different gradients of the collocated reconstructed luma samples of the same block; (i, j) is the coordinate of a sample in the block; coefficients $a_0$ to $a_n$ are model parameters which can be derived based on the value of the reconstructed adjacent chroma samples and the k different gradients of the collocated reconstructed adjacent luma samples at both encoder and decoder side by one of the above-described methods of using Least Mean Square (LMS) to derive the model parameters. For example, the LDL decomposed method can be used to derive the coefficients.

In one example, two gradients are used together to derive the predicted value of a chroma sample as shown in Equation 63. The two gradients $G_{L1}(i, j)$ and $G_{L2}(i, j)$ can be calculated according to the horizontal gradient pattern and the vertical gradient pattern as shown in Equation 14 and Equation 15.

$$\text{pred}_c(i, j) = a_2 \cdot G_{L2}(i, j) + a_1 \cdot G_{L1}(i, j) + a_0 \quad \text{(Eq. 63)}$$

In another example, four gradients are used together to derive the predicted value of a chroma sample as shown in Equation 64. The four gradients $G_{L1}(i, j)$ to $G_{L4}(i, j)$ can be calculated according to the four gradient patterns as shown in Equations 14-17.

$$\text{pred}_c(i, j) = a_4 \cdot G_{L4}(i, j) + a_3 \cdot G_{L3}(i, j) + a_2 \cdot G_{L2}(i, j) + a_1 \cdot G_{L1}(i, j) + a_0 \quad \text{(Eq. 64)}$$

In another example, the number of gradients and the gradient patterns that are used together to derive the predicted value of a chroma sample can be determined by a signaled syntax element.

In some embodiments, another new GLM method is proposed, in which a chroma sample of the current block is predicted from multiple gradients of the collocated reconstructed luma samples and the value of the collocated down-sampled reconstructed luma sample as shown in Equation 65:

$$\text{pred}_c(i, j) = a_n \cdot G_{Lk}(i, j) + \ldots + a_2 \cdot G_{L1}(i, j) + a_1 \cdot \text{rec}'_L(i, j) + a_0 \quad \text{(Eq. 65)}$$

where $\text{pred}_c(i, j)$ represents the predicted values of the chroma samples in the current block; $G_{L1}(i, j)$ to $G_{Lk}(i, j)$ represent k different gradients of the collocated reconstructed luma samples of the same block; $\text{rec}'_L(i, j)$ represents the reconstructed values of the collocated luma samples of the same block which are down-sampled for the case of non-4:4:4 color format by one of the aforementioned down-sampled filters; (i, j) is the coordinate of a sample in the block; coefficients $a_0$ to $a_n$ are model parameters which can be derived based on the value of the reconstructed adjacent chroma samples and the gradients of the collocated reconstructed adjacent luma samples at both encoder and decoder side by one of the above-described methods of using Least Mean Square (LMS) to derive the model parameters. For example, the LDL decomposed method can be used to derive the coefficients.

In one example, two gradients of the collocated reconstructed luma samples and the value of the collocated down-sampled reconstructed luma sample are used together to derive the predicted value of a chroma sample as shown in Equation 66. The two gradients $G_{L1}(i, j)$ and $G_{L2}(i, j)$ can be calculated according to the horizontal gradient pattern and the vertical gradient pattern as shown in Equation 14 and Equation 15.

$$\text{pred}_c(i, j) = a_3 \cdot G_{L2}(i, j) + a_2 \cdot G_{L1}(i, j) + a_1 \cdot \text{rec}'_L(i, j) + a_0 \quad \text{(Eq. 66)}$$

In another example, four gradients of the collocated reconstructed luma samples and the value of the collocated down-sampled reconstructed luma sample are used together to derive the predicted value of a chroma sample as shown in Equation 67. The four gradients $G_{L1}(i, j)$ to $G_{L4}(i, j)$ can be calculated according to the gradient patterns as shown in Equations 14-17.

$$\text{pred}_c(i, j) = a_5 \cdot G_{L4}(i, j) + a_4 \cdot G_{L3}(i, j) + a_3 \cdot G_{L2}(i, j) + a_2 \cdot G_{L1}(i, j) + a_1 \cdot \text{rec}'_L(i, j) + a_0 \quad \text{(Eq. 67)}$$

In another example, the number of gradients and the gradient patterns that are used together to derive the predicted value of a chroma sample can be determined by a signaled syntax element.

In some embodiments, a non-linear term of the value of the collocated down-sampled reconstructed luma sample is added to calculate a chroma sample. For example, as represented by Equation 68, the non-linear term is added to the GLM method corresponding to Equation 62 to calculate a chroma sample. In another example, as represented by Equation 69, the non-linear term is added to the GLM method corresponding to Equation 65 to calculate a chroma sample. The value of x can be any positive integer that greater than 1. In one example, the value of x is equal to 2.

$$\text{pred}_c(i, j) = a_n \cdot G_{Lk}(i, j) + \ldots + a_2 \cdot G_{L1}(i, j) + a_1 \cdot (\text{rec}'_L(i, j))^x + a_0 \quad \text{(Eq. 68)}$$

$$\text{pred}_c(i, j) = a_n \cdot G_{Lk}(i, j) + \ldots + a_3 \cdot G_{L1}(i, j) + a_2 \cdot \text{rec}'_L(i, j) + a_1 \cdot (\text{rec}'_L(i, j))^x + a_0 \quad \text{(Eq. 69)}$$

In some embodiments, both of the two GLM methods corresponding to Equation 62 and Equation 65 are supported and a block level flag is signaled in the bitstream to indicate which GLM method is used to predict the current chroma block. That is, the block level flag is signaled to indicate whether to use the value of the collocated down-sampled reconstructed luma sample to predict chroma samples or not.

In some embodiments, the number of the gradients supported is modified.

In one example, only one gradient is supported. For example, only the horizontal gradient pattern corresponding to Equation 14 is supported.

In another example, a slice level syntax element is signaled to indicate the number of the gradient patterns supported in the current slice.

In some embodiments, the coding method of the gradient patterns is modified. A truncated unary code is used to code which of the gradient patterns is used. For example, the four gradient patterns as shown in Equations 14-17 are supported and a truncated unary code is used to code the syntax element that indicates which of the four gradient patterns is used, as shown in Table 1.

TABLE 1

Exemplary truncated unary codewords for different gradient patterns

| Gradient pattern | Truncated unary codeword |
|---|---|
| Horizontal gradient pattern corresponding to Equation 14 | 0 |
| Vertical gradient pattern corresponding to Equation 15 | 10 |
| Diagonal gradient pattern corresponding to Equation 16 | 110 |
| Diagonal gradient pattern corresponding to Equation 17 | 111 |

In some embodiments, the Cb and Cr components can share the same GLM enable flag.

In one example, one flag is signaled to indicate whether GLM is used for both the Cb and Cr components. If the flag indicates GLM is used, two syntax elements are signaled to indicate which gradient pattern is used for Cb and Cr, respectively.

In another example, one flag is signaled to indicate whether GLM is used for both the Cb and Cr components. If the flag indicates GLM is used, one syntax element is signaled to indicate which gradient pattern is used for both Cb and Cr.

In some embodiments, multiple lines are used to derive the GLM model parameters. Specifically, n chroma neighboring lines can be used to derive the GLM model parameters, where the value of n can be equal to any positive integer which is greater than 1. For example, the value of n is equal to 6.

Figure 7:
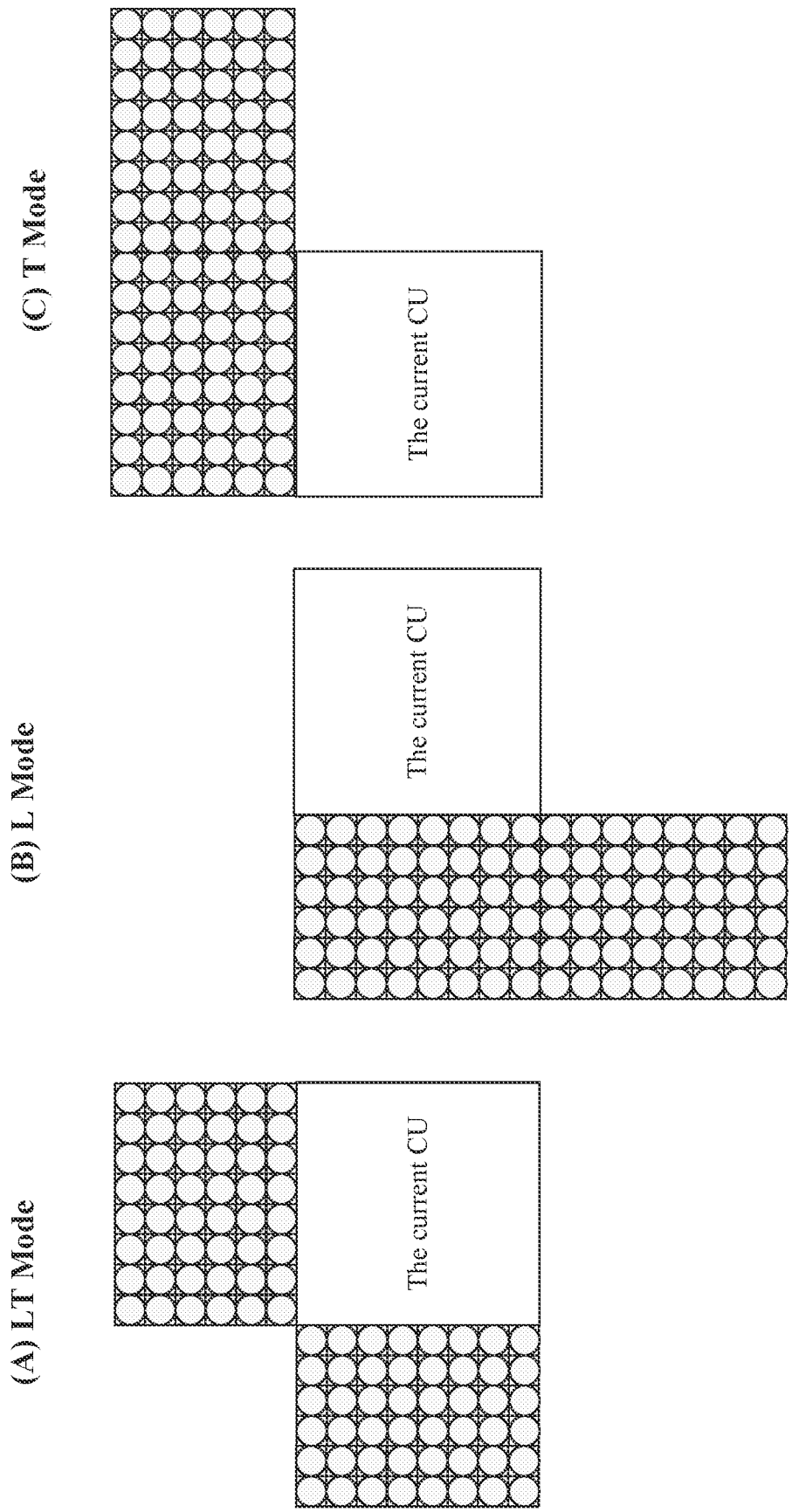
FIG. 7 is a schematic diagram illustrating an example method for using samples on neighboring lines to derive parameters of a gradient model, according to some embodiments of the present disclosure.

In one example, GLM supports CCLM_LT, CCLM_L and CCLM_T modes and 6 chroma neighboring lines are used to derive the GLM parameters. FIG. 7 is a schematic diagram illustrating a method for using samples on neighboring lines to derive parameters of a gradient model, according to some embodiments of the present disclosure. FIG. 7 shows the samples on neighboring lines of a chroma block as circles. Specifically, as shown in FIG. 7, for a W×H chroma block: when GLM is used for CCLM_LT mode, the above 6 lines samples and left 6 lines samples are used for deriving the GLM parameters (FIG. 7A); when GLM is used for CCLM_L mode, the left 6 lines samples and below-left 6 lines samples are used for deriving the GLM parameters (FIG. 7B); and when GLM is used for CCLM_T mode, the above 6 lines samples and above-right 6 lines samples are used for deriving the GLM parameters (FIG. 7C).

Figure 8:
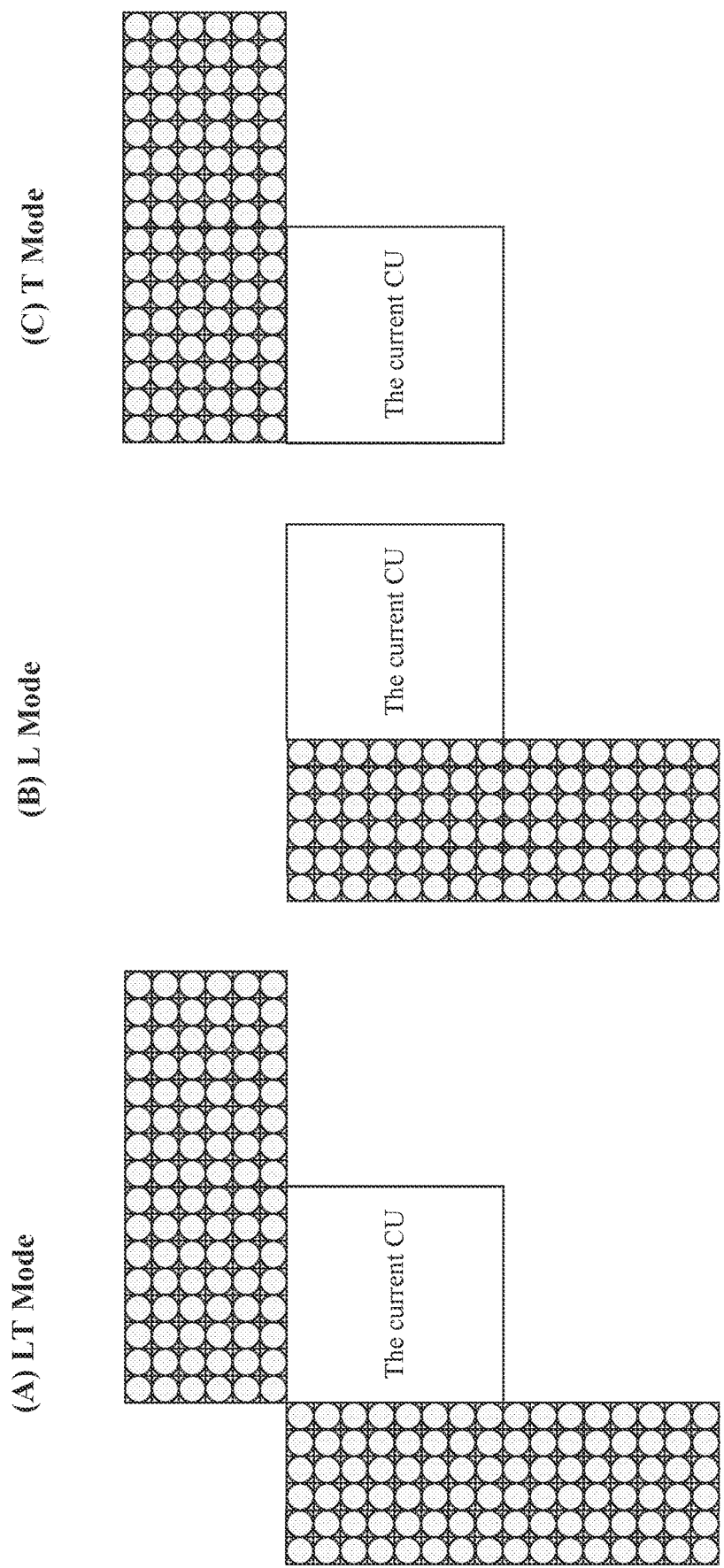
FIG. 8 is a schematic diagram illustrating another example method for using samples on neighboring lines to derive parameters of a gradient model, according to some embodiments of the present disclosure.

In another example, GLM supports CCLM_LT, CCLM_L and CCLM_T modes and 6 chroma neighboring lines are used to derive the GLM parameters. FIG. 8 is a schematic diagram illustrating a method for using samples on neighboring lines to derive parameters of a gradient model, according to some embodiments of the present disclosure. FIG. 8 shows the samples on neighboring lines of a chroma block as circles. Specifically, as shown in FIG. 8, for a W×H chroma block: when GLM is used for CCLM_LT mode, the above 6 lines samples, above-right 6 lines samples, left 6 lines samples and below-left 6 lines samples are used for deriving the GLM parameters (FIG. 8A); when GLM is used for CCLM_L mode, the left 6 lines samples and below-left 6 lines samples are used for deriving the GLM parameters (FIG. 8B); and when GLM is used for CCLM_T mode, the above 6 lines samples and above-right 6 lines samples are used for deriving the GLM parameters (FIG. 8C).

In some embodiments, the above-left adjacent samples are also included in the samples used for deriving GLM model parameters, when the GLM is used for CCLM_LT mode.

In some embodiments, the aforementioned extension to the number of lines for deriving GLM model parameters is only applied to some GLM modes. For example, the two GLM methods corresponding to Equation 22 and Equation 54 respectively may be supported, and a flag is signaled to indicate which GLM method is used for the current block. Then, when the GLM method corresponding to Equation 22 is used, only one adjacent line is used to derive GLM model parameters, and when the GLM method corresponding to Equation 54 is used, six adjacent lines are used to derive GLM model parameters.

In some embodiments, variants of multi-model GLM methods are proposed. In multi-model GLM method, more than one models can be used to predict the chroma samples in a block. The classification can be done based on the value of the gradient G, the sign of the gradient G, the absolute value of the gradient G or the value of the down-sampled reconstructed luma sample $rec'_L(i, j)$. Then each class is treated as an independent training set to derive the model parameters that indicate the relationship between the gradient G and the value of the chroma samples or the values of the down-sampled reconstructed luma samples $rec'_L(i, j)$ and the value of the chroma samples. Finally, the chroma samples are predicted differently in different classes.

In one example, the gradients of the reconstructed adjacent samples are first classified into two classes by the sign of the gradients. That is, the positive gradients are in a first class, and the negative gradients are in a second class. Then each class is treated as an independent training set to derive a linear model, using the aforementioned LMMSE method. Subsequently, the gradients of the reconstructed luma samples of the current block are also classified based on the same rule. Finally, the chroma samples are predicted by the gradients of the reconstructed luma samples differently in different classes according to the method in Equation 22.

In another example, the gradients of the reconstructed adjacent samples are first classified into two classes using a threshold, which is the average of the absolute values of the gradients of the luma reconstructed adjacent samples. That is, the gradients whose absolute values are greater than or equal to the threshold are classified into a first class, and the gradients whose absolute values are less than the threshold are classified into a second class. Then each class is treated as an independent training set to derive a linear model, using the aforementioned LMMSE method. Subsequently, the gradients of the reconstructed luma samples of the current block are also classified based on the same rule. Finally, for the first class, the chroma samples are predicted from the gradients according to the Equation 22, for the second class, the chroma samples are predicted from the down-sampled reconstructed luma samples according to Equation 1.

In some embodiments, the aforementioned embodiments associated with the disclosed GLM methods can be freely combined.

In one example, only one GLM method corresponding to Equation 54 is supported. For a chroma block, one flag is signaled to indicate whether GLM is used for both the Cb and Cr components. If the flag indicates GLM is used for both the Cb and Cr components, one syntax element is signaled by truncated unary code to indicate which of the four gradient patterns corresponding to Equations 14-17 is used for both Cb and Cr. Six adjacent lines are used to derive the model parameters.

In another example, two GLM methods corresponding to Equation 22 and Equation 54 respectively are supported. For a chroma block, one flag is signaled to indicate whether GLM is used for both the Cb and Cr components. If the flag indicates that GLM is used, another flag is signaled to indicate which of the two GLM methods is used, and one syntax element is signaled by truncated unary code to indicate which of the four gradient patterns corresponding to Equations 14-17 is used for both Cb and Cr. When the GLM method corresponding to Equation 22 is used, only one adjacent line is used to derive model parameters, and when the GLM method corresponding to Equation 54 is used, six adjacent lines are used to derive model parameters.

In some embodiments, when predicting a chroma sample, an offset can be subtracted from the term of the down-sampled reconstructed luma sample. The offset can be different for each block. For example, this offset can be equal to the first down-sampled reconstructed luma sample in the current block or related to the bit depth. For example, the method in Equation 54 can be modified as:

$$pred_c(i, j) = a_2 \cdot G_L(i, j) + a_1 \cdot (rec'_L(i, j) - \text{offset}) + a_0 \quad \text{(Eq. 70)}$$

Figure 9:
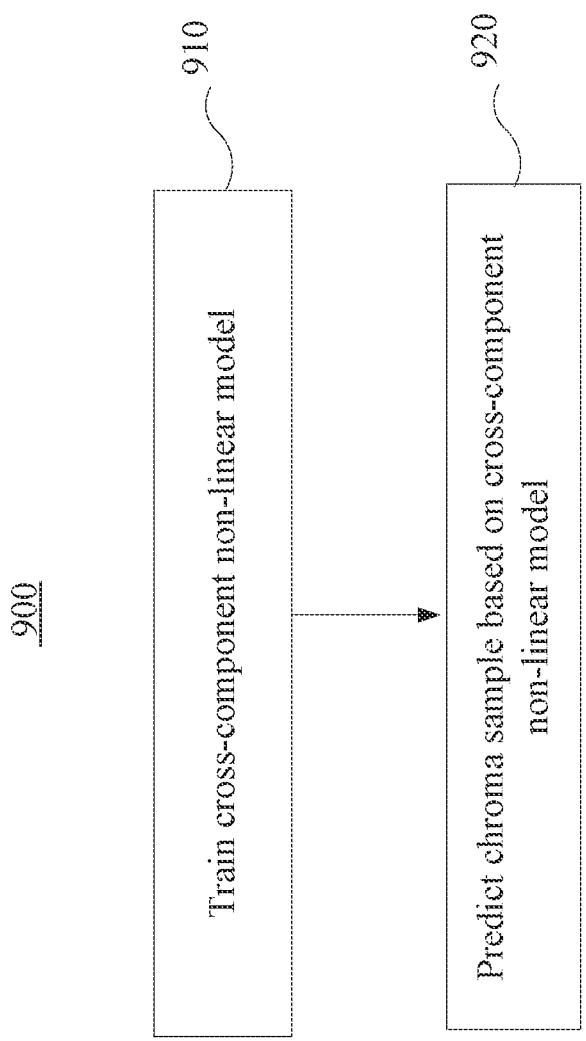
FIG. 9 is a flow chart of an example method for predicting chroma samples using a cross-component non-linear model, according to some embodiments of present disclosure.

The above-described embodiments can be performed as part of a video data processing process, such as an encoding process or a decoding process. FIG. 9 is a flow chart of a method 900 for predicting chroma samples using a cross-component non-linear model, according to some embodiments of present disclosure. Method 900 can be performed by an encoder (e.g., by process 200A of FIG. 2A or 200B of FIG. 2B) or by a decoder (e.g., by process 300A of FIG. 3A or 300B of FIG. 3B) or performed by one or more software or hardware components of an apparatus (e.g., apparatus 400 of FIG. 4), in predicting chroma samples. For example, one or more processors (e.g., processor 402 of FIG. 4) can perform method 900. In some embodiments, method 900 can be implemented by a computer program product, embodied in a computer-readable medium, including computer-executable instructions such as program code, executed by computers (e.g., apparatus 400 of FIG. 4). As shown in FIG. 9, method 900 includes the following steps 910-920.

At step 910, a processor (e.g., processor 402 of FIG. 4) trains a cross-component non-linear model (CCNLM). The CCNLM defines a non-linear relationship between predicted chroma samples and collocated reconstructed luma samples. For example, the CCNLM can be a non-linear model described in Equation 40. The model parameters in Equation 40, i.e., $a_n, a_{n-1}, \ldots, a_1$, and $a_0$, can be any values. For example, at least one of the parameters $a_n, a_{n-1}, \ldots, a_1$, and $a_0$ can be equal to zero. In some embodiments, the model parameters $a_n, a_{n-1}, \ldots, a_1$, and $a_0$ are determined based on a bit depth of a picture, such that all the model parameters are of a similar order of magnitude. In case of non-4:4:4 color format, such as when the color format is 4:2:2 or 4:2:0, the $rec'_L(i, j)$ in Equation 40 is a down-sampled value of a plurality of reconstructed luma samples associated with the coordinate (i, j).

During the model training, the processor uses a training data set to derive the model parameters $a_n, a_{n-1}, \ldots a_1$, and $a_0$. In some embodiments, the training can be performed by an encoder and the training data set includes original chroma samples of a coding block and original collocated luma samples of the coding block. After the training is complete, the encoder can encode the derived model parameters $a_n, a_{n-1}, \ldots, a_1$, and $a_0$ in a bitstream to be transmitted to a decoder. In some embodiments, the training data set includes reconstructed adjacent chroma samples of the coding block and reconstructed adjacent luma sample of the coding block. Such training based on reconstructed adjacent luma or chroma samples can be performed in either the encoder side or the decoder side, and thus does not require explicit signaling of the derived model parameters $a_n, a_{n-1}, \ldots, a_1$, and $a_0$. In Some embodiments, the training can be performed by minimizing a mean square error (MSE) between the reconstructed adjacent luma samples and the predicted adjacent chroma samples of a chroma block. In some embodiments, the training can be performed using a CCLM_LT mode, a CCLM_L mode, or a CCLM_T mode. The CCLM_LT mode uses both the above adjacent reconstructed luma/chroma samples and the left adjacent reconstructed luma/chroma samples as training data (e.g., FIG. 5A, FIG. 6A). The CCLM_L mode uses the left adjacent reconstructed luma/chroma samples as training data (e.g., FIG. 5B, FIG. 6B). The CCLM_T mode uses the above adjacent reconstructed luma/chroma samples as training data (e.g., FIG. 5C, FIG. 6C).

Referring back to FIG. 9, at step 920, the processor predicts a chroma sample based on the CCNLM. In some embodiments, more than one non-linear model can be used to predict chroma samples in a coding block. For example, the processor may perform a comparison of the reconstructed luma samples in the coding block with one or more threshold values, and classify, based on the comparison, the reconstructed luma samples in the coding block into the plurality of classes. The threshold values may be statistical values of the reconstructed luma samples in the coding block, such as an average or a median of the reconstructed luma samples. The processor may then apply a plurality of different non-linear models to the plurality of classes, respectively. In some embodiments, the training of such multi-models can be performed using an MMNLM_LT mode, an MMNLM_L mode, or an MMNLM_T mode. The MMNLM_LT mode uses both the above adjacent reconstructed luma/chroma samples and the left adjacent reconstructed luma/chroma samples as training data (e.g., FIG. 5A, FIG. 6A). The MMNLM_L mode uses the left adjacent reconstructed luma/chroma samples as training data (e.g., FIG. 5B, FIG. 6B). The MMNLM_T mode uses the above adjacent reconstructed luma/chroma samples as training data (e.g., FIG. 5C, FIG. 6C). In some embodiments, the non-linear model used in method 900 can also include terms represented by the gradients of the collocated reconstructed luma samples. For example, the gradient-based non-linear model can be defined as one of Equations 46-53. The details for combining the gradients with a non-linear model are described above in connection with these equations.

Figure 10:
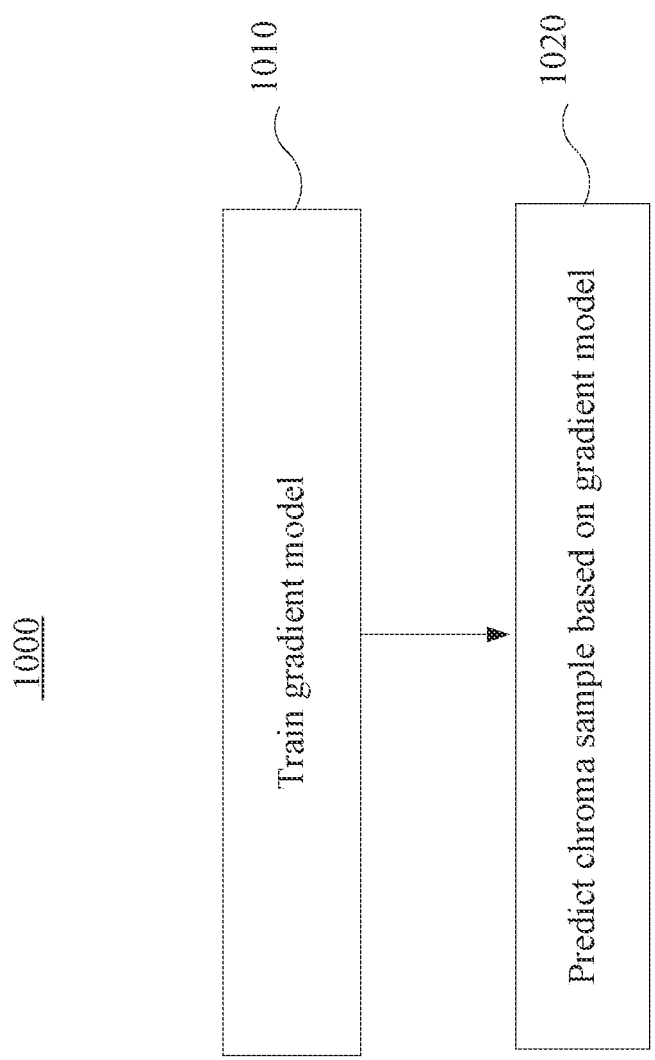
FIG. 10 is a flow chart of an example method for predicting chroma samples using a gradient model, according to some embodiments of the present disclosure.

FIG. 10 is a flow chart of a method 1000 for predicting chroma samples using a cross-component non-linear model, according to some embodiments of present disclosure. Method 1000 can be performed by an encoder (e.g., by process 200A of FIG. 2A or 200B of FIG. 2B) or by a decoder (e.g., by process 300A of FIG. 3A or 300B of FIG. 3B) or performed by one or more software or hardware components of an apparatus (e.g., apparatus 400 of FIG. 4), in predicting chroma samples. For example, one or more processors (e.g., processor 402 of FIG. 4) can perform method 1000. In some embodiments, method 1000 can be implemented by a computer program product, embodied in a computer-readable medium, including computer-executable instructions such as program code, executed by computers (e.g., apparatus 400 of FIG. 4). As shown in FIG. 10, method 1000 includes the following steps 1010-1020.

At step 1010, a processor (e.g., processor 402 of FIG. 4) trains a gradient model. In some embodiments, the gradient model may be a linear model (e.g., Equation 22, Equation 54) specifying a linear relationship between predicted chroma samples and collocated reconstructed luma samples. In some embodiments, the gradient model may be a non-linear model (e.g., Equation 46) specifying a non-linear relationship between predicted chroma samples and collocated reconstructed luma samples. In some embodiments, the gradient model may be a hybrid model (e.g., Equation 39, Equation 49) based on both the gradients of the collocated reconstructed luma samples and the values of the collocated reconstructed luma samples. In some embodiments, the gradient model may be a model (e.g., Equation 62) defining a relationship between the predicted chroma samples and more than one gradient of the collocated reconstructed luma samples, each of the one or more gradients being determined by applying a different gradient pattern to a plurality of reconstructed luma samples associated with the collocated reconstructed luma sample. For example, the gradient patterns can be the patterns defined by Equations 23-38).

During the model training, the processor uses a training data set to derive the model parameters. In some embodiments, the training data set includes one or more lines of above adjacent samples of the current coding block (e.g., FIG. 7A). In some embodiments, the training data set includes one or more lines of above-right adjacent samples of the coding block (e.g., FIG. 7C, FIG. 8A, FIG. 8C). In some embodiments, the training data set includes one or more lines of left adjacent samples of the coding block (e.g., FIG. 7A). In some embodiments, the training data set includes one or more lines of below-left adjacent samples of the coding block (e.g., FIG. 7B, FIG. 8A, FIG. 8B). In some embodiments, the training data set includes one or more above-left adjacent samples of the coding block.

Referring back to FIG. 10, at step 1020, the processor predicts a chroma sample based on the gradient model. In some embodiments, more than one gradient model can be used to predict chroma samples in a coding block. For example, the processor may perform a comparison of the reconstructed luma samples in the coding block with one or more threshold values, and classify, based on the comparison, the reconstructed luma samples in the coding block into a first plurality of classes. The threshold values may include an absolute value of a gradient of the reconstructed luma samples, a sign of the gradient of the reconstructed luma samples, or a down-sampled value of the reconstructed luma samples. The processor may then apply a plurality of different gradient models to the first plurality of classes, respectively. In some embodiments, the training of such multi-models can be performed by using the thresholds to classify the reconstructed adjacent luma and chroma samples into a second plurality of classes. The plurality of gradient models can then be trained using the second plurality of classes, respectively.

In some embodiments, a non-transitory computer-readable storage medium is also provided. In some embodiments, the medium can store all or portions of the video bit stream encoded or decoded according to the disclosed cross-component prediction methods. Moreover, the video bit stream can include flags or syntax elements signaling the disclosed cross-component models or gradient models. For example, the video bit stream can include a flag indicating whether a CCNLM or a gradient model is enabled. As another example, the video bit stream can include a syntax element signaling whether more than one non-linear model or gradient model are used to predict chroma samples in a coding block from collocated reconstructed luma samples.

In some embodiments, the non-transitory computer-readable storage medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A video processing method, comprising:
   determining a first value associated with a chroma sample, by applying a first gradient pattern to reconstructed values of a first plurality of luma samples;
   determining a second value associated with the chroma sample, by applying a down-sampling filter to reconstructed values of a second plurality of luma samples; and
   predicting the chroma sample based on the first value and the second value.

2. The method according to clause 1, wherein the first plurality of luma samples and the second plurality of luma samples each comprise at least one of:
   a collocated luma sample of the chroma sample, or
   a neighboring luma sample of the collocated luma sample.

3. The method according to clause 1, wherein applying the first gradient pattern to the reconstructed values of the first plurality of luma samples comprises:
   encoding or decoding a syntax element in a bitstream; and
   selecting, based on the syntax element, the first gradient pattern from a plurality of gradient patterns.

4. The method according to clause 1, wherein predicting the chroma sample based on the first value and the second value comprises:
   predicting the chroma sample based on a first parameter associated with the first value, a second parameter associated with the second value, and a third parameter.

5. The method according to clause 4, wherein the predicting of the chroma sample is based on $pred_c(i, j) = a_1 \cdot G_L(i, j) + a_2 \cdot rec'_L(i, j) + a_3$, wherein:
   $(i, j)$ represents a coordinate of the chroma sample,
   $pred_c(i, j)$ is a predicted value of the chroma sample,
   $G_L(i, j)$ is the first value,
   $rec'_L(i, j)$ is the second value, and
   $a_1$, $a_2$, and $a_3$ are the first parameter, the second parameter, and the third parameter, respectively.

6. The method according to clause 4, wherein the third parameter is determined based on a bit depth of a picture.

7. The method according to clause 4, wherein the chroma sample belongs to a coding block, and the method further comprises:
   determining the first parameter, the second parameter, and the third parameter based on one or more adjacent samples of the coding block.

8. The method according to clause 7, wherein the one or more adjacent samples of the coding block comprise at least one of:
   an adjacent luma sample of the coding block, or
   an adjacent chroma sample of the coding block.

9. The method according to clause 7, wherein the one or more adjacent samples of the coding block are selected from:
   one or more lines of above adjacent samples or left adjacent samples of the coding block.

10. The method according to clause 9, further comprising:
    encoding or decoding a syntax element in a bitstream; and
    determining a number of the one or more lines based on the syntax element, wherein:
    if the syntax element is equal to a third value, the number of the one or more lines is one, and
    if the syntax element is equal to a fourth value, the number of the one or more lines is greater than one.

11. The method according to clause 7, further comprising:
    encoding or decoding a syntax element in a bitstream,
    determining, based on the syntax element, the one or more adjacent samples of the coding block, wherein:
        if the syntax element is equal to a third value, the one or more adjacent samples are selected from above adjacent samples and left adjacent samples of the coding block,
        if the syntax element is equal to a fourth value, the one or more adjacent samples are selected from above adjacent samples of the coding block, and
        if the syntax element is equal to a fifth value, the one or more adjacent samples are selected from left adjacent samples of the coding block.

12. The method according to clause 1, wherein predicting the chroma sample based on the first value and the second value comprises:
    predicting, based on the first value and the second value, a Cb component and a Cr component of the chroma sample.

13. The method according to clause 1, wherein predicting the chroma sample further comprises:
    predicting the chroma sample based on a plurality of values,
    wherein each of the plurality of values is determined by applying a different gradient pattern to the reconstructed values of the first plurality of luma samples.

14. The method according to clause 1, further comprising:
    encoding or decoding a syntax element in a bitstream, wherein the syntax element indicates whether the predicting of the chroma sample is based on both the first and second values.

15. A video processing apparatus, comprising:
    a memory storing a set of instructions; and
    one or more processors configured to execute the set of instructions to cause the apparatus to perform:
        determining a first value associated with a chroma sample, by applying a first gradient pattern to reconstructed values of a first plurality of luma samples;
        determining a second value associated with the chroma sample, by applying a down-sampling filter to reconstructed values of a second plurality of luma samples; and
        predicting the chroma sample based on the first value and the second value.

16. The apparatus according to clause 15, wherein the first plurality of luma samples and the second plurality of luma samples each comprise at least one of:
    a collocated luma sample of the chroma sample, or
    a neighboring luma sample of the collocated luma sample.

17. The apparatus according to clause 15, wherein in applying the first gradient pattern to the reconstructed values of the first plurality of luma samples, the one or more processors are configured to execute the set of instructions to cause the apparatus to perform:
    encoding or decoding a syntax element in a bitstream; and
    selecting, based on the syntax element, the first gradient pattern from a plurality of gradient patterns.

18. The apparatus according to clause 15, wherein in predicting the chroma sample based on the first value and the second value, the one or more processors are configured to execute the set of instructions to cause the apparatus to perform:
    predicting the chroma sample based on a first parameter associated with the first value, a second parameter associated with the second value, and a third parameter.

19. The apparatus according to clause 18, wherein the predicting of the chroma sample is based on $pred_c(i, j) = a_1 \cdot G_L(i, j) + a_2 \cdot rec'_L(i, j) + a_3$, wherein:
    (i, j) represents a coordinate of the chroma sample,
    $pred_c(i, j)$ is a predicted value of the chroma sample,
    $G_L(i, j)$ is the first value,
    $rec'_L(i, j)$ is the second value, and
    $a_1$, $a_2$, and $a_3$ are the first parameter, the second parameter, and the third parameter, respectively.

20. The apparatus according to clause 18, wherein the third parameter is determined based on a bit depth of a picture.

21. The apparatus according to clause 18, wherein the chroma sample belongs to a coding block, and the one or more processors are configured to execute the set of instructions to cause the apparatus to perform:
    determining the first parameter, the second parameter, and the third parameter based on one or more adjacent samples of the coding block.

22. The apparatus according to clause 21, wherein the one or more adjacent samples of the coding block comprise at least one of:
    an adjacent luma sample of the coding block, or
    an adjacent chroma sample of the coding block.

23. The apparatus according to clause 21, wherein the one or more adjacent samples of the coding block are selected from:
    one or more lines of above adjacent samples or left adjacent samples of the coding block.

24. The apparatus according to clause 23, wherein the one or more processors are configured to execute the set of instructions to cause the apparatus to perform:
    encoding or decoding a syntax element in a bitstream; and
    determining a number of the one or more lines based on the syntax element, wherein:
        if the syntax element is equal to a third value, the number of the one or more lines is one, and
        if the syntax element is equal to a fourth value, the number of the one or more lines is greater than one.

25. The apparatus according to clause 21, wherein the one or more processors are configured to execute the set of instructions to cause the apparatus to perform:
    encoding or decoding a syntax element in a bitstream,
    determining, based on the syntax element, the one or more adjacent samples of the coding block, wherein:
        if the syntax element is equal to a third value, the one or more adjacent samples are selected from above adjacent samples and left adjacent samples of the coding block,
        if the syntax element is equal to a fourth value, the one or more adjacent samples are selected from above adjacent samples of the coding block, and
        if the syntax element is equal to a fifth value, the one or more adjacent samples are selected from left adjacent samples of the coding block.

26. The apparatus according to clause 15, wherein in predicting the chroma sample based on the first value and the second value, the one or more processors are configured to execute the set of instructions to cause the apparatus to perform:

predicting, based on the first value and the second value, a Cb component and a Cr component of the chroma sample.

27. The apparatus according to clause 15, wherein in predicting the chroma sample, the one or more processors are configured to execute the set of instructions to cause the apparatus to perform:
predicting the chroma sample based on a plurality of values,
wherein each of the plurality of values is determined by applying a different gradient pattern to the reconstructed values of the first plurality of luma samples.

28. The apparatus according to clause 15, wherein the one or more processors are configured to execute the set of instructions to cause the apparatus to perform:
encoding or decoding a syntax element in a bitstream, wherein the syntax element indicates whether the predicting of the chroma sample is based on both the first and second values.

29. A non-transitory computer readable medium that stores a bitstream of video for processing according to a method including:
determining a first value associated with a chroma sample, by applying a first gradient pattern to reconstructed values of a first plurality of luma samples;
determining a second value associated with the chroma sample, by applying a down-sampling filter to reconstructed values of a second plurality of luma samples; and
predicting the chroma sample based on the first value and the second value.

30. The non-transitory computer readable medium according to clause 29, wherein the first plurality of luma samples and the second plurality of luma samples each comprise at least one of:
a collocated luma sample of the chroma sample, or
a neighboring luma sample of the collocated luma sample.

31. The non-transitory computer readable medium according to clause 29, wherein applying the first gradient pattern to the reconstructed values of the first plurality of luma samples comprises:
encoding or decoding a syntax element in a bitstream; and
selecting, based on the syntax element, the first gradient pattern from a plurality of gradient patterns.

32. The non-transitory computer readable medium according to clause 29, wherein predicting the chroma sample based on the first value and the second value comprises:
predicting the chroma sample based on a first parameter associated with the first value, a second parameter associated with the second value, and a third parameter.

33. The non-transitory computer readable medium according to clause 32, wherein the predicting of the chroma sample is based on $pred_c(i, j) = a_1 \cdot G_L(i, j) + a_2 \cdot rec'_L(i, j) + a_3$, wherein:
(i, j) represents a coordinate of the chroma sample,
$pred_c(i, j)$ is a predicted value of the chroma sample,
$G_L(i, j)$ is the first value,
$rec'_L(i, j)$ is the second value, and
$a_1$, $a_2$, and $a_3$ are the first parameter, the second parameter, and the third parameter, respectively.

34. The non-transitory computer readable medium according to clause 32, wherein the third parameter is determined based on a bit depth of a picture.

35. The non-transitory computer readable medium according to clause 32, wherein the chroma sample belongs to a coding block, and the method further comprises:
determining the first parameter, the second parameter, and the third parameter based on one or more adjacent samples of the coding block.

36. The non-transitory computer readable medium according to clause 35, wherein the one or more adjacent samples of the coding block comprise at least one of:
an adjacent luma sample of the coding block, or
an adjacent chroma sample of the coding block.

37. The non-transitory computer readable medium according to clause 35, wherein the one or more adjacent samples of the coding block are selected from:
one or more lines of above adjacent samples or left adjacent samples of the coding block.

38. The non-transitory computer readable medium according to clause 37, further comprising:
encoding or decoding a syntax element in a bitstream; and
determining a number of the one or more lines based on the syntax element, wherein:
if the syntax element is equal to a third value, the number of the one or more lines is one, and
if the syntax element is equal to a fourth value, the number of the one or more lines is greater than one.

39. The non-transitory computer readable medium according to clause 35, further comprising:
encoding or decoding a syntax element in a bitstream,
determining, based on the syntax element, the one or more adjacent samples of the coding block, wherein:
if the syntax element is equal to a third value, the one or more adjacent samples are selected from above adjacent samples and left adjacent samples of the coding block,
if the syntax element is equal to a fourth value, the one or more adjacent samples are selected from above adjacent samples of the coding block, and
if the syntax element is equal to a fifth value, the one or more adjacent samples are selected from left adjacent samples of the coding block.

40. The non-transitory computer readable medium according to clause 29, wherein predicting the chroma sample based on the first value and the second value comprises:
predicting, based on the first value and the second value, a Cb component and a Cr component of the chroma sample.

41. The non-transitory computer readable medium according to clause 29, wherein predicting the chroma sample further comprises:
predicting the chroma sample based on a plurality of values,
wherein each of the plurality of values is determined by applying a different gradient pattern to the reconstructed values of the first plurality of luma samples.

42. The non-transitory computer readable medium according to clause 29, further comprising:
encoding or decoding a syntax element in a bitstream, wherein the syntax element indicates whether the predicting of the chroma sample is based on both the first and second values.

43. A video processing method, comprising:
predicting a chroma sample from a collocated luma sample associated with the chroma sample,
wherein the predicting is based on a non-linear model defining a non-linear relationship between a predicted value of the chroma sample and a value associated with the collocated luma sample.

44. The method according to clause 43, wherein the non-linear model is represented by a non-linear equation:

$pred_c(i, j) = a_n \cdot (rec'_L(i, j))^n + a_{n-1} \cdot (rec'_L(i, j))^{n-1} + \ldots + a_1 \cdot rec'_L(i, j) + a_0$, wherein:
(i, j) represents a coordinate of the chroma sample,
$pred_c(i, j)$ is the predicted value of the chroma sample,
$rec'_L(i, j)$ is the value associated with the collocated luma sample,
n is an integer equal to or larger than 2, and
$a_n, a_{n-1}, \ldots a_1$, and $a_0$ are parameters of the the non-linear model.

45. The method according to clause 44, wherein at least one of the parameters $a_n, a_{n-1}, \ldots a_1$, and $a_0$ is equal to zero.

46. The method according to clause 44, wherein at least one of the parameters $a_n, a_{n-1}, \ldots a_1$, and $a_0$ is determined based on a bit depth of a picture.

47. The method according to clause 44, wherein the chroma sample belongs to a coding block, and the method further comprises:
determining the parameters $a_n, a_{n-1}, \ldots a_1$, and $a_0$ based on adjacent samples of the coding block.

48. The method according to clause 43, further comprising:
determining the value associated with the collocated luma sample by applying a down-sampling filter to reconstructed values of a plurality of luma samples associated with the collocated luma sample.

49. The method according to clause 43, wherein more than one non-linear model is used to predict chroma samples in a coding block, and the method further comprises:
classifying luma samples in the coding block into a plurality of classes; and
applying a plurality of non-linear models to the plurality of classes, respectively.

50. The method according to clause 43, wherein the non-linear model further defines a relationship between the predicted value of the chroma sample and a gradient value associated with the collocated luma sample, wherein:
the gradient value is determined based on applying a gradient pattern to reconstructed values of a plurality of luma samples associated with the collocated luma sample.

51. The method according to clause 50, wherein the non-linear model comprises at least one term represented by $a_n \cdot (G_L(i, j))^n$, wherein:
(i, j) represents a coordinate of the chroma sample,
$G_L(i, j)$ is the gradient value,
n is an integer equal to or larger than 1, and
$a_n$ is a parameter of the non-linear model.

52. The method according to clause 51, wherein the non-linear model further comprises at least one term represented by $a_m \cdot (rec'_L(i, j))^m$, wherein:
$rec'_L(i, j)$ is the value associated with the collocated luma sample,
m is an integer equal to or larger than 1, and
$a_m$ is a parameter of the the non-linear model.

53. A video processing apparatus, comprising:
a memory storing a set of instructions; and
one or more processors configured to execute the set of instructions to cause the apparatus to perform:
predicting a chroma sample from a collocated luma sample associated with the chroma sample,
wherein the predicting is based on a non-linear model defining a non-linear relationship between a predicted value of the chroma sample and a value associated with the collocated luma sample.

54. The apparatus according to clause 53, wherein the non-linear model is represented by a non-linear equation:

$pred_c(i, j) = a_n \cdot (rec'_L(i, j))^n + a_{n-1} \cdot (rec'_L(i, j))^{n-1} + \ldots + a_1 \cdot rec'_L(i, j) + a_0$, wherein:
(i, j) represents a coordinate of the chroma sample,
$pred_c(i, j)$ is the predicted value of the chroma sample,
$rec'_L(i, j)$ is the value associated with the collocated luma sample,
n is an integer equal to or larger than 2, and
$a_n, a_{n-1}, \ldots a_1$, and $a_0$ are parameters of the the non-linear model.

55. The apparatus according to clause 54, wherein at least one of the parameters $a_n, a_{n-1}, \ldots a_1$, and $a_0$ is equal to zero.

56. The apparatus according to clause 54, wherein at least one of the parameters $a_n, a_{n-1}, \ldots a_1$, and $a_0$ is determined based on a bit depth of a picture.

57. The apparatus according to clause 54, wherein the chroma sample belongs to a coding block, and the one or more processors are configured to execute the set of instructions to cause the apparatus to perform:
determining the parameters $a_n, a_{n-1}, \ldots a_1$, and $a_0$ based on adjacent samples of the coding block.

58. The apparatus according to clause 53, where the one or more processors are configured to execute the set of instructions to cause the apparatus to perform:
determining the value associated with the collocated luma sample by applying a down-sampling filter to reconstructed values of a plurality of luma samples associated with the collocated luma sample.

59. The apparatus according to clause 53, wherein more than one non-linear model is used to predict chroma samples in a coding block, and the one or more processors are configured to execute the set of instructions to cause the apparatus to perform:
classifying luma samples in the coding block into a plurality of classes; and
applying a plurality of non-linear models to the plurality of classes, respectively.

60. The apparatus according to clause 53, wherein the non-linear model further defines a relationship between the predicted value of the chroma sample and a gradient value associated with the collocated luma sample, wherein:
the gradient value is determined based on applying a gradient pattern to reconstructed values of a plurality of luma samples associated with the collocated luma sample.

61. The apparatus according to clause 60, wherein the non-linear model comprises at least one term represented by $a_n \cdot (G_L(i, j))^n$, wherein:
(i, j) represents a coordinate of the chroma sample,
$G_L(i, j)$ is the gradient value,
n is an integer equal to or larger than 1, and $a_n$ is a parameter of the non-linear model.

62. The apparatus according to clause 61, wherein the non-linear model further comprises at least one term represented by $a_m \cdot (rec'_L(i, j))^m$, wherein:
    $rec'_L(i, j)$ is the value associated with the collocated luma sample,
    m is an integer equal to or larger than 1, and
    $a_m$ is a parameter of the the non-linear model.

63. A non-transitory computer readable medium that stores a bitstream of video for processing according to a method including:
    predicting a chroma sample from a collocated luma sample associated with the chroma sample,
    wherein the predicting is based on a non-linear model defining a non-linear relationship between a predicted value of the chroma sample and a value associated with the collocated luma sample.

64. The non-transitory computer readable medium according to clause 63, wherein the non-linear model is represented by a non-linear equation:
    $pred_c(i, j) = a_n \cdot (rec'_L(i, j))^n + a_{n-1} \cdot (rec'_L(i, j))^{n-1} + \ldots + a_1 \cdot rec'_L(i, j) + a_0$,
    wherein:
    (i, j) represents a coordinate of the chroma sample,
    $pred_c(i, j)$ is the predicted value of the chroma sample,
    $rec'_L(i, j)$ is the value associated with the collocated luma sample,
    n is an integer equal to or larger than 2, and
    $a_n, a_{n-1}, \ldots a_1$, and $a_0$ are parameters of the the non-linear model.

65. The non-transitory computer readable medium according to clause 64, wherein at least one of the parameters $a_n, a_{n-1}, \ldots a_1$, and $a_0$ is equal to zero.

66. The non-transitory computer readable medium according to clause 64, wherein at least one of the parameters $a_n, a_{n-1}, \ldots a_1$, and $a_0$ is determined based on a bit depth of a picture.

67. The non-transitory computer readable medium according to clause 64, wherein the chroma sample belongs to a coding block, and the method further comprises:
    determining the parameters $a_n, a_{n-1}, \ldots a_1$, and $a_0$ based on adjacent samples of the coding block.

68. The non-transitory computer readable medium according to clause 63, further comprising:
    determining the value associated with the collocated luma sample by applying a down-sampling filter to reconstructed values of a plurality of luma samples associated with the collocated luma sample.

69. The non-transitory computer readable medium according to clause 63, wherein more than one non-linear model is used to predict chroma samples in a coding block, and the method further comprises:
    classifying luma samples in the coding block into a plurality of classes; and applying a plurality of non-linear models to the plurality of classes, respectively.

70. The non-transitory computer readable medium according to clause 63, wherein the non-linear model further defines a relationship between the predicted value of the chroma sample and a gradient value associated with the collocated luma sample, wherein:
    the gradient value is determined based on applying a gradient pattern to reconstructed values of a plurality of luma samples associated with the collocated luma sample.

71. The non-transitory computer readable medium according to clause 70, wherein the non-linear model comprises at least one term represented by $a_n \cdot (G_L(i, j))^n$, wherein:
    (i, j) represents a coordinate of the chroma sample,
    $G_L(i, j)$ is the gradient value,
    n is an integer equal to or larger than 1, and
    $a_n$ is a parameter of the non-linear model.

72. The non-transitory computer readable medium according to clause 71, wherein the non-linear model further comprises at least one term represented by $a_m \cdot (rec'_L(i, j))^m$, wherein:
    $rec'_L(i, j)$ is the value associated with the collocated luma sample,
    m is an integer equal to or larger than 1, and
    $a_m$ is a parameter of the the non-linear model.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:
   determining a first value associated with a chroma sample, by applying a first gradient pattern to reconstructed values of a first plurality of luma samples;
   determining a second value associated with the chroma sample, by applying a down-sampling filter to reconstructed values of a second plurality of luma samples; and
   predicting the chroma sample based on the first value and the second value;
   wherein predicting the chroma sample based on the first value and the second value comprises:
   predicting the chroma sample based on a first parameter associated with the first value, a second parameter associated with the second value, and a third parameter;
   wherein the predicting of the chroma sample is based on $pred_c(i, j) = a_1 \cdot G_L(i, j) + a_2 \cdot rec'_L(i, j) + a_3$, wherein:
   (i, j) represents a coordinate of the chroma sample,
   $pred_c(i, j)$ is a predicted value of the chroma sample,
   $G_L(i, j)$ is the first value,
   $rec'_L(i, j)$ is the second value, and
   $a_1$, $a_2$, and $a_3$ are the first parameter, the second parameter, and the third parameter, respectively.

2. The method according to claim 1, wherein the first plurality of luma samples and the second plurality of luma samples each comprise at least one of:
   a collocated luma sample of the chroma sample, or
   a neighboring luma sample of the collocated luma sample.

3. The method according to claim 1, wherein applying the first gradient pattern to the reconstructed values of the first plurality of luma samples comprises:
   encoding or decoding a syntax element in a bitstream; and
   selecting, based on the syntax element, the first gradient pattern from a plurality of gradient patterns.

4. The method according to claim 1, wherein the third parameter is determined based on a bit depth of a picture.

5. The method according to claim 1, wherein the chroma sample belongs to a coding block, and the method further comprises:
   determining the first parameter, the second parameter, and the third parameter based on one or more adjacent samples of the coding block.

6. The method according to claim 5, wherein the one or more adjacent samples of the coding block comprise at least one of:
   an adjacent luma sample of the coding block, or
   an adjacent chroma sample of the coding block.

7. The method according to claim 5, wherein the one or more adjacent samples of the coding block are selected from:
   one or more lines of above adjacent samples or left adjacent samples of the coding block.

8. The method according to claim 7, further comprising:
   encoding or decoding a syntax element in a bitstream; and
   determining a number of the one or more lines based on the syntax element, wherein:
   if the syntax element is equal to a third value, the number of the one or more lines is one, and
   if the syntax element is equal to a fourth value, the number of the one or more lines is greater than one.

9. The method according to claim 5, further comprising:
   encoding or decoding a syntax element in a bitstream,
   determining, based on the syntax element, the one or more adjacent samples of the coding block, wherein:
   if the syntax element is equal to a third value, the one or more adjacent samples are selected from above adjacent samples and left adjacent samples of the coding block,
   if the syntax element is equal to a fourth value, the one or more adjacent samples are selected from above adjacent samples of the coding block, and
   if the syntax element is equal to a fifth value, the one or more adjacent samples are selected from left adjacent samples of the coding block.

10. The method according to claim 1, wherein predicting the chroma sample based on the first value and the second value comprises:
    predicting, based on the first value and the second value, a Cb component and a Cr component of the chroma sample.

11. The method according to claim 1, wherein predicting the chroma sample further comprises:
    predicting the chroma sample based on a plurality of values,
    wherein each of the plurality of values is determined by applying a different gradient pattern to the reconstructed values of the first plurality of luma samples.

12. The method according to claim 1, further comprising:
    encoding or decoding a syntax element in a bitstream,
    wherein the syntax element indicates whether the predicting of the chroma sample is based on both the first and second values.

13. A video processing apparatus, comprising:
    a memory storing a set of instructions; and
    one or more processors configured to execute the set of instructions to cause the apparatus to perform:
    determining a first value associated with a chroma sample, by applying a first gradient pattern to reconstructed values of a first plurality of luma samples;
    determining a second value associated with the chroma sample, by applying a down-sampling filter to reconstructed values of a second plurality of luma samples; and
    predicting the chroma sample based on the first value and the second value;
    wherein in predicting the chroma sample based on the first value and the second value, the one or more processors are configured to execute the set of instructions to cause the apparatus to perform:
    predicting the chroma sample based on a first parameter associated with the first value, a second parameter associated with the second value, and a third parameter;
    wherein the predicting of the chroma sample is based on $pred_c(i, j) = a_1 \cdot G_L(i, j) + a_2 \cdot rec'_L(i, j) + a_3$, wherein:
    (i, j) represents a coordinate of the chroma sample,
    $pred_c(i,j)$ is a predicted value of the chroma sample,
    $G_L(i, j)$ is the first value,
    $rec'_L(i, j)$ is the second value, and
    $a_1$, $a_2$, and $a_3$ are the first parameter, the second parameter, and the third parameter, respectively.

14. The apparatus according to claim 13, wherein the first plurality of luma samples and the second plurality of luma samples each comprise at least one of:
    a collocated luma sample of the chroma sample, or
    a neighboring luma sample of the collocated luma sample.

15. The apparatus according to claim 13, wherein in applying the first gradient pattern to the reconstructed values of the first plurality of luma samples, the one or more processors are configured to execute the set of instructions to cause the apparatus to perform:

encoding or decoding a syntax element in a bitstream; and
selecting, based on the syntax element, the first gradient pattern from a plurality of gradient patterns.

16. A non-transitory computer readable medium that stores a bitstream of video for processing according to a method comprising:

determining a first value associated with a chroma sample, by applying a first gradient pattern to reconstructed values of a first plurality of luma samples;

determining a second value associated with the chroma sample, by applying a down-sampling filter to reconstructed values of a second plurality of luma samples; and predicting the chroma sample based on the first value and the second value;

wherein in predicting the chroma sample based on the first value and the second value, the one or more processors are configured to execute the set of instructions to cause the apparatus to perform:

predicting the chroma sample based on a first parameter associated with the first value, a second parameter associated with the second value, and a third parameter;

wherein the predicting of the chroma sample is based on $pred_c(i, j) = a_1 \cdot G_L(i, j) + a_2 \cdot rec'_L(i, j) + a_3$, wherein:

(i, j) represents a coordinate of the chroma sample, $pred_c(i,j)$ is a predicted value of the chroma sample, $G_L(i, j)$ is the first value, $rec'_L(i, j)$ is the second value, and $a_1$, $a_2$, and $a_3$ are the first parameter, the second parameter, and the third parameter, respectively.

* * * * *